(12) United States Patent
Fadden et al.

(10) Patent No.: US 11,596,250 B2
(45) Date of Patent: Mar. 7, 2023

(54) MODULAR STORAGE SYSTEM

(71) Applicant: MorePeas LLC, Seattle, WA (US)

(72) Inventors: Allison Jane Fadden, Seattle, WA (US); Jessica Lyne Severt, Seattle, WA (US); Adam Abraham Jossem, Seattle, WA (US)

(73) Assignee: MorePeas LLC, Seattle, WA (US)

( * ) Notice: Subject to any disclaimer, the term of this patent is extended or adjusted under 35 U.S.C. 154(b) by 0 days.

(21) Appl. No.: 17/236,511

(22) Filed: Apr. 21, 2021

(65) Prior Publication Data

US 2021/0386227 A1 Dec. 16, 2021

Related U.S. Application Data

(60) Provisional application No. 63/039,353, filed on Jun. 15, 2020.

(51) Int. Cl.
*A47G 19/22* (2006.01)
*B65D 21/02* (2006.01)

(52) U.S. Cl.
CPC ..... *A47G 19/2261* (2013.01); *A47G 19/2222* (2013.01); *B65D 21/0219* (2013.01)

(58) Field of Classification Search
CPC ............ A47G 19/2261; A47G 19/2222; A47G 19/23; A47G 21/0216; B65D 51/18; B65D 51/24; B65D 21/0224; B65D 21/022; B65D 21/0226; B65D 21/0234; B65D 21/00; B65D 21/02; B65D 21/0201
USPC ......... 220/737, 254.1, 254.2, 780, 781, 212, 220/256.1, 740, 729, 916; 215/392, 393; 206/581, 823
See application file for complete search history.

(56) References Cited

U.S. PATENT DOCUMENTS

| 1,892,140 | A | | 12/1932 | Fogler | |
|---|---|---|---|---|---|
| 3,091,361 | A | * | 5/1963 | Gawron | B65D 21/0222 206/508 |
| 4,091,953 | A | * | 5/1978 | Daenen | A47J 47/02 220/23.6 |
| 4,143,785 | A | * | 3/1979 | Ferrell | B65D 41/0421 215/DIG. 1 |
| 4,869,381 | A | | 9/1989 | Agner | |
| 4,955,493 | A | * | 9/1990 | Touzani | B65D 1/0292 220/666 |

(Continued)

FOREIGN PATENT DOCUMENTS

CN 107468004 A 12/2017

*Primary Examiner* — Anthony D Stashick
*Assistant Examiner* — Prince Pal
(74) *Attorney, Agent, or Firm* — Seed IP Law Group LLP

(57) ABSTRACT

A modular storage system includes a number of receptacles and lids with different sizes and features that are interchangeably coupleable to each other in a stacking arrangement. A first lid has slits to provide access to a receptacle and a second lid has a suction cup and is structured to be interchangeably coupleable to the receptacle and the first lid. A user can remove the second lid from the top of the first lid and secure the second lid to the bottom of the receptacle with the suction cup secured to an external surface. A third lid includes an opening covered by a deflectable membrane. The membrane prevents liquid from spilling from the opening if the receptacle is knocked over. A straw can be inserted through the membrane and opening to provide further functionality.

20 Claims, 36 Drawing Sheets

(56) References Cited

U.S. PATENT DOCUMENTS

| | | | | |
|---|---|---|---|---|
| 5,255,816 A * | 10/1993 | Trepp | B65D 25/2823 | 220/4.27 |
| 5,273,182 A * | 12/1993 | Laybourne | A47G 23/03 | 248/346.11 |
| 5,409,126 A * | 4/1995 | DeMars | B65D 43/0222 | 206/508 |
| 5,570,797 A * | 11/1996 | Yeh | A47G 19/2272 | 215/392 |
| 5,775,483 A * | 7/1998 | Lown | B65D 21/0219 | 206/508 |
| 6,814,250 B1 * | 11/2004 | Madsen | A47G 19/065 | 220/921 |
| 7,357,273 B1 * | 4/2008 | Lutz | A47J 36/027 | 220/636 |
| 7,510,096 B2 * | 3/2009 | Wang | B65D 21/083 | 206/508 |
| 8,002,140 B2 | 8/2011 | Schantz et al. | | |
| 8,302,798 B2 | 11/2012 | Moss | | |
| D675,067 S | 1/2013 | Del Solar et al. | | |
| D686,042 S | 7/2013 | Del Solar et al. | | |
| D686,043 S | 7/2013 | Del Solar et al. | | |
| D686,044 S | 7/2013 | Del Solar et al. | | |
| 8,757,426 B1 * | 6/2014 | Serrano | A47G 19/2261 | 220/737 |
| 8,985,363 B2 | 3/2015 | Gubitosi et al. | | |
| D751,391 S | 3/2016 | Wu | | |
| D751,392 S | 3/2016 | Wu | | |
| 9,399,297 B2 * | 7/2016 | Cho | F16B 47/00 | |
| 9,801,483 B2 * | 10/2017 | D'Alesio | F16B 47/00 | |
| 10,053,277 B2 * | 8/2018 | Rahmel | A61J 1/2089 | |
| 10,206,531 B2 | 2/2019 | Chan | | |
| 10,773,861 B2 * | 9/2020 | Caswell | B65D 43/0202 | |
| 11,001,423 B2 * | 5/2021 | Porto | B65D 43/0218 | |
| 11,021,296 B2 * | 6/2021 | Sudakoff | B65D 51/1683 | |
| 2001/0022304 A1 * | 9/2001 | Roche | B65D 43/0229 | 220/802 |
| 2002/0134789 A1 * | 9/2002 | Lin | A47G 19/2205 | 220/759 |
| 2003/0155363 A1 * | 8/2003 | Mercier | B65D 77/0486 | 220/630 |
| 2004/0069677 A1 * | 4/2004 | Baudin | B65D 51/18 | 206/823 |
| 2005/0072709 A1 * | 4/2005 | Mann | B65D 21/0224 | 206/503 |
| 2005/0252923 A1 | 11/2005 | Woolf | | |
| 2006/0151511 A1 * | 7/2006 | Kaposi | A47J 36/06 | 220/573.1 |
| 2007/0029325 A1 * | 2/2007 | Herold | B65D 41/04 | 220/737 |
| 2007/0029333 A1 * | 2/2007 | Dua | A47J 36/34 | 220/628 |
| 2009/0078712 A1 * | 3/2009 | Zimmerman | A47G 19/2261 | 220/636 |
| 2010/0187240 A1 * | 7/2010 | Zimmerman | A47G 19/2261 | 220/592.2 |
| 2011/0284537 A1 * | 11/2011 | Cerasani | B65D 85/36 | 220/694 |
| 2011/0290815 A1 * | 12/2011 | Weld | B65D 51/007 | 206/509 |
| 2013/0248537 A1 * | 9/2013 | Lane | A47G 23/00 | 220/574.3 |
| 2013/0320164 A1 * | 12/2013 | Pyon | F16B 47/00 | 248/206.3 |
| 2014/0284342 A1 * | 9/2014 | Hewitt | F25D 3/08 | 220/592.24 |
| 2015/0114963 A1 * | 4/2015 | Billett | A47G 23/03 | 220/738 |
| 2015/0114964 A1 * | 4/2015 | Vogel | B65D 25/28 | 220/253 |
| 2015/0353241 A1 * | 12/2015 | Glaser | B65D 55/02 | 53/476 |
| 2016/0000271 A1 * | 1/2016 | Park | B65D 45/20 | 220/203.29 |
| 2016/0009465 A1 * | 1/2016 | Pan | B65D 21/0219 | 220/200 |
| 2016/0075484 A1 * | 3/2016 | Baughman | B44D 3/127 | 220/254.1 |
| 2017/0225843 A1 * | 8/2017 | Glaser | B65D 43/0277 | |
| 2017/0238737 A1 * | 8/2017 | Chan | A47J 19/04 | |
| 2018/0312306 A1 * | 11/2018 | Caswell | B65D 51/249 | |
| 2019/0069703 A1 | 3/2019 | Boak et al. | | |
| 2019/0300236 A1 * | 10/2019 | Herlin | B65D 51/20 | |
| 2021/0007522 A1 * | 1/2021 | Stuart | A47G 23/0225 | |
| 2021/0137322 A1 * | 5/2021 | Mann | B65D 83/0835 | |

* cited by examiner

MODULAR STORAGE SYSTEM

BACKGROUND

Technical Field

The present disclosure is directed to a modular storage system with articles that are interchangeably coupleable to each other and articles structured to engage a support surface.

Description of the Related Art

Food storage systems and devices are generally known. Within the broader category of food storage systems and devices, products have been developed that are specifically designed for toddlers and young children. For example, known products include snack cups with lids that are designed to prevent snacks from spilling if a young child knocks over the snack cup. Further, products have been designed to attach to hard surfaces to prevent the product from being knocked over. However, such products contain a number of deficiencies such as limited functionality and bulky size, among others.

BRIEF SUMMARY

The present disclosure generally describes modular food storage containers with cups, bowls, plates, lids, and other articles that are interchangeably coupleable to each other. In other words, a lid for a cup can be used as the lid for a bowl, or a bowl may be coupled to a lid of a cup in a space saving stacking arrangement, among other configurations described herein.

In one or more examples described herein, the modular food storage system includes a cup with a handle for storing materials, such as liquid or solid food items. The cup has an opening at the top and a first lid that is designed to close the opening. The first lid includes a flexible portion with at least one slit to provide access to the cup through the opening, while retaining solid food stored in the cup in the event the cup is knocked over. The system further includes a second lid that is designed to attach to the cup or the first lid in a stacking arrangement. The second lid is solid (e.g., does not include any slits or openings) in order to close the cup. The second lid includes a suction cup extending from a surface of the second lid and is designed to be reversible, meaning that the second lid can be secured to the first lid to cover the first lid for secure storage of the food in the cup or the second lid can be inverted and secured to a bottom of the cup, with the suction cup attached to an exterior surface, in order to hold the cup in place while in use.

The system further includes one or more bowls, which are designed to hold solid or liquid food, among other materials. The bowls can be coupled to the first or second lids of the cup in a stacking arrangement. A third lid is associated with each of the bowls, wherein the third lid is the same as the second lid, in some cases. In some examples, the third lid similarly includes a suction cup, such that the bowl and third lid can be used independent of the cup with the suction cup of the third lid securing the bowl, or the third lid associated with the bowl can be secured to a bottom of the cup, with the bowl stacked on the first and second lids, to increase a height of the system for easier access to the material inside the bowl. Still further, the system may include a fourth lid that is similar to a "sippy" lid that is designed to be coupled to the cup or bowl and includes a protrusion extending from the fourth lid and an axial bore through the protrusion.

A layer of material or a membrane with at least one slit covers the axial bore such that the fourth lid prevents liquid from spilling out of the cup when the cup is knocked over, but allows for the passage of liquid through the at least one slit under negative pressure. A straw can be inserted through the membrane and the axial bore to add further functionality. The straw includes a ridge or stopper to prevent the straw from uncoupling with the axial bore as well as grooves around the stopper and straw for increased airflow during use. In some examples, the straw does not include the ridge or stopper but includes grooves in the straw for increased airflow during use. The fourth lid may also include an air hole to prevent a vacuum from forming (i.e., to improve airflow) during use. The fourth lid can be used in conjunction with the other lids described above. For example, the straw can be removed and the third lid can be coupled to the fourth lid to cover the protrusion for secure storage of the food or liquid in the cup.

The system also includes a plate that may include partitions for organizing different types of food and a fifth lid associated with the plate. The fifth lid may have similar features to the lids described above. For example, the fifth lid may be interchangeably coupleable to opposite sides of the plate and may include a suction cup, such that the fifth lid can be used for secure storage of food or liquid on the plate and reversed to engage the suction cup to a support surface during use. Multiple plates and fifth lids can be coupled together in a space-saving stacking arrangement.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. In some figures, the structures are drawn to scale. In some figures, the sizes and relative positions of elements in the drawings are not necessarily drawn to scale. For example, the sizes and shapes of various elements and angles may be enlarged and positioned in the figures to improve drawing legibility in some figures.

DETAILED DESCRIPTION

Figure 1:
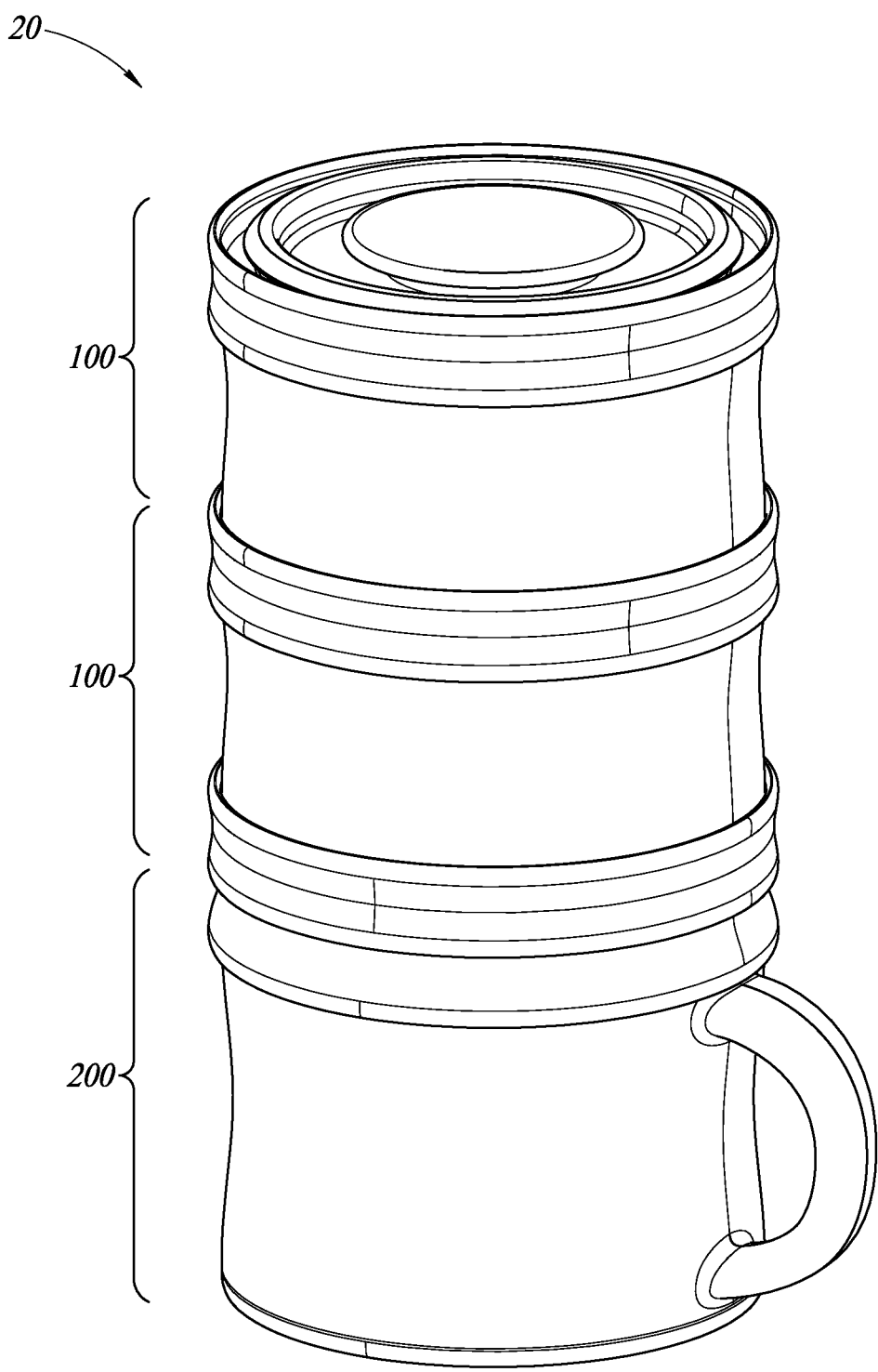
FIG. 1 is a perspective view of an embodiment of a modular storage system including a cup, a plurality of lids, and a plurality of bowls in a stacked configuration.

FIG. 1 is a perspective view of a modular storage assembly 20. The following description presents embodiments of the storage assembly 20 directed to storing solid and liquid food items. However, the concepts of the embodiments described herein can be applied to storage systems for any number of different types of items. Further, the concepts and embodiments described herein can be applied outside of the storage context, such as with any two items that may be coupled together or with any set of items that are designed to be interchangeable with each other. For example, the concepts presented herein can be used with any modular or stackable items, and not necessarily food storage containers. As such, the present disclosure is not limited solely to the storage of food.

The modular storage assembly 20 includes one or more bowl assemblies 100 coupled to a cup assembly 200. In the illustrated embodiment, there are two bowl assemblies 100 and a single cup assembly 200. In some embodiments, there are more or fewer than two bowl assemblies 100 and more or fewer than one cup assembly 200. For example, the system 20 may include only cup assembly 200 or only one or more bowl assemblies 100, or more or fewer than two bowl assemblies 100 in conjunction with the cup assembly 200.

Although the bowl assemblies 100 and the cup assembly 200 are illustrated in use together in FIG. 1, the bowl assemblies 100 can be produced and sold as a separate set from the cup assembly 200. As such, while the bowl assemblies 100 can be stacked with the cup assembly 200, as shown, it is not required for the bowl assemblies 100 to be sold as a set or kit with the cup assembly 200, but rather, each component part can be sold separately. For example, each bowl assembly 100 can be sold separately and each cup assembly 200 can be sold separately, such that the user can purchase the correct number of assemblies 100, 200 for their storage needs. The bowl assemblies 100 may be sold with one bowl assembly 100 per set, or with multiple bowl assemblies 100 per set. Further, any of the lids or other component parts discussed herein can be sold as separate replacement parts apart from the entire assemblies 100, 200.

The bowl assemblies 100 and the cup assembly 200 and all of their component parts described herein and are formed of food grade silicone, in one or more embodiments. However, in some embodiments, the bowl assemblies 100 and the cup assembly 200 may include any number of different materials, such as wood, plastic, silicone, metal such as aluminum or stainless steel, or others, either alone or in combination. The storage assembly 20 is shown in FIG. 1 in a storage configuration wherein the bowl assemblies 100 and cup assembly are sealed to prevent spillage of food or beverage items inside the bowl assemblies 100 and cup assembly 200.

Figure 2:
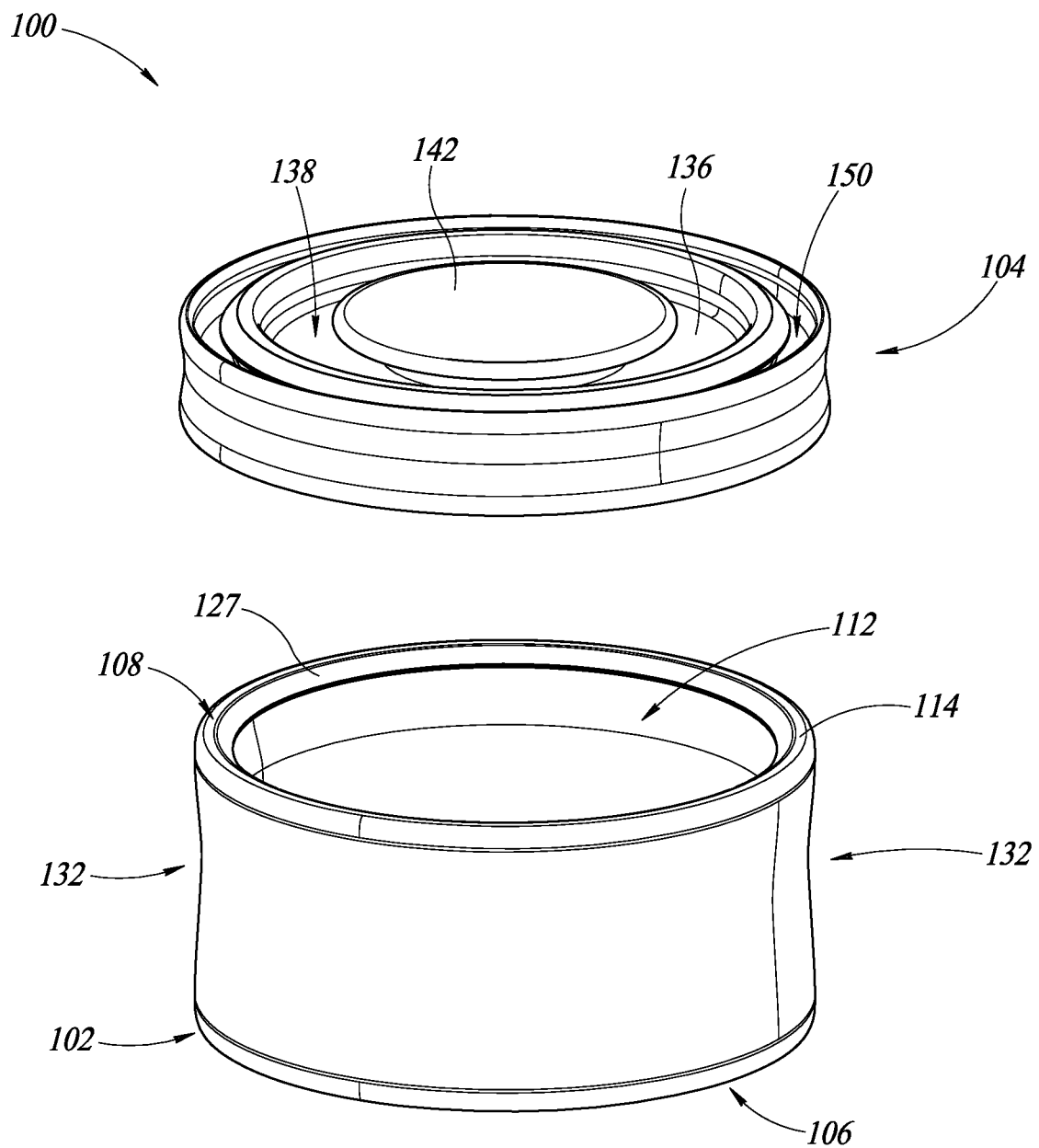
FIG. 2 is an exploded perspective view of one of the bowls and one of the lids of FIG. 1.
Figure 3:
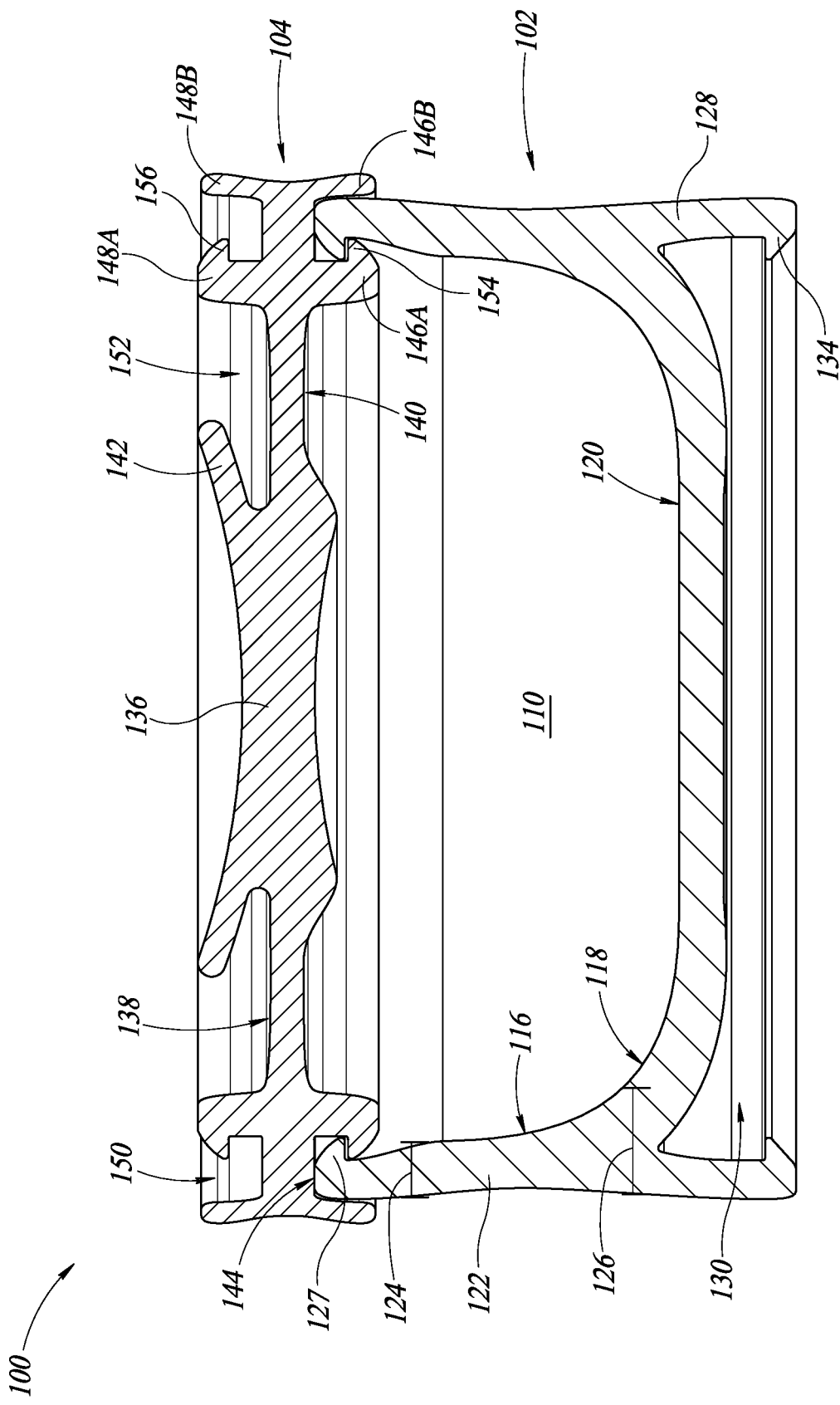
FIG. 3 is a diametric cross-sectional view of one of the bowls and one of the lids of FIG. 1.

FIG. 2 is an exploded view of one of the bowl assemblies 100 illustrated in FIG. 1. FIG. 3 is a cross-sectional view of one of the bowl assemblies 100 in a storage configuration. Although FIGS. 2 and 3 illustrates a single bowl assembly 100, it is to be appreciated that each of the bowl assemblies 100 described herein can have the same or similar features.

With reference to FIGS. 2 and 3, the bowl assembly 100 includes a base 102 and a lid 104. The base 102 is hollow, in some embodiments. More specifically, the base 102 has a bottom surface 106 and a top surface 108 with a cavity 110 extending from the top surface 108 toward the bottom surface 106. In some embodiments, the cavity 110 extends at least 50%, at least 60%, at least 70%, at least 80%, or more into the base toward the bottom surface 106. The base 102 further includes an opening 112 in the top surface 108 to provide access to the cavity 110. An upper peripheral edge 114 of the base 102 around the opening 112 is rounded or curved, in some embodiments. Further, an internal surface bounding the cavity 110 includes a sidewall surface 116, a transition surface 118, and a bottom surface 120. In some embodiments, the sidewall surface 116 and the bottom surface 120 are cylindrical, flat and planar, respectively, and at an angle to each other that is within plus or minus 15 degrees of perpendicular, while the transition surface 118 is curved or rounded to transition between the sidewall surface 116 and the bottom surface 120 to make it easier to remove food items stored in the base 102.

As shown in FIG. 3, the base 102 includes a sidewall 122 which has a thickness that may vary along a height of the sidewall 122. For example, a first thickness 124 of the sidewall 122 proximate the top surface 108 and opening 112 may be less than a second thickness 126 of the sidewall 122 proximate the transition surface 118. In some embodiments, the thickness of the sidewall 122 transitions continuously from the first thickness 124 to the second thickness 126, while in one or more embodiments, the thickness may have a step down or step up configuration. In one or more embodiments, the first thickness 124 is greater than the second thickness 126, or the thicknesses 124, 126 may be equal. An upper portion of the sidewall 122 terminates with a protrusion 127 extending radially inward into opening 112, which may also be referred to herein as a flange 127. In some embodiments, the protrusion 127 extends around an entire periphery of the sidewall 122 and within plus or minus 5 degrees of perpendicular to the sidewall 122, while in one or more embodiments, the protrusion 127 extends along only a portion of the periphery of the sidewall 122. Further, the protrusion 127 may include several portions that are spaced from each about the upper periphery of the sidewall 122. For example, there may be two, three, four, or more protrusions 127 separate and distinct from each other and spaced from each other about the periphery of the sidewall 122.

The base 102 further includes a ridge 128 extending from the base 102 that defines a further cavity or aperture 130 below the bottom internal surface 120. The ridge 128 extends continuously with sidewalls 122 of the base 102. In other words, the base 102 includes the ridge 128 and the sidewalls 122 as a single, integral, unitary component. The base 102 further includes radial constrictions 132 along sidewalls 122, such that a thickness of the base 102 proximate the ridge 128 and the top surface 108 is greater than a thickness along the sidewall 122, in some embodiments. A flange 134 extends radially inward from the ridge 128. In other words, the flange 134 extends into the aperture 130 bounded by the ridge 128. In one or more embodiments, the flange 134 extends perpendicularly to the ridge 128. In the illustrated embodiment, the flange 134 extends into the aperture 130 around an entirety of the ridge 128 and the aperture 130. However, in some embodiments, the flange 134 extends from the ridge 128 along only a portion of the ridge 128. As such, there may be more than one flange 134, such as several flanges spaced from each other about ridge 128. Still further, the flange 134 may extend radially outward from the ridge 128, or may extend at the ridge 128 from any angle, in some embodiments. The ridge 128, aperture 130, and flange 134 are configured to receive and secure the lid 102, or other component parts of system 20, as explained further below.

The lid 104 includes a body 136 with a top surface 138 and a bottom surface 140. A suction cup 142 extends from the top surface 138. In some embodiments, the suction cup 142 is positioned centrally with respect to body 136 of the lid 104. Further, the lid 104 includes a first channel 144 defined by opposing first ridges or sidewalls 146A, 146B which each extend from the bottom surface 140 of the body 136. In one or more embodiments, the first ridges 146A, 146B extend around an entire periphery of the lid 104, such that first channel 144 also extends along the entire periphery of lid 104. In some embodiments, the ridges 146A, 146B and channel 144 extend around only a portion of the periphery of the lid 104. Still further, the ridges 146A, 146B and channel 144 may extend around several portions of the lid 104, with each portion spaced from the other portions. For example, there may be three sets of ridges 146A, 146B and channels 144 spaced equidistant about lid, or two sets, or more or less.

A second set of opposing ridges 148A, 148B extend from the top surface 138 to define a second channel 150. The second set of ridges 148A, 148B further define a cavity or aperture 152 between the second ridges 148A, 148B and the suction cup 142. As shown in FIGS. 2 and 3, the ridges 146A, 148A are positioned radially inward toward suction cup 142 relative to ridges 146B, 148B. Further, the first ridges 146A, 146B are aligned with the second ridges 148A, 148B, in some embodiments. In one or more embodiments, the ridges 148A, 148A are positioned radially outward from ridges 146B, 148B, and the first and second ridges 146A, 146B, 148A, 148B are spaced from each other. The first ridge 146A further includes a first flange 154 and the second ridge 148A further includes a second flange 156. In some embodiments, the first and second flanges 154, 156 extend perpendicularly from corresponding ridges 146A, 148A. In one or more embodiments, the flanges 154, 156 extend at a transverse angle to the ridges 146A, 148A or, in one or more embodiments, at an angle that is within plus or minus 15 degrees of perpendicular.

The first channel 144 has a size and a shape to receive the sidewall 122 of the bowl 102 and the protrusion 127 in a friction fit, as shown in FIG. 3. More specifically, the protrusion 127 of the sidewall 122 of the bowl is received in the first channel 144 in direct contact with, or proximate to, the first flange 154 of the first ridge 146A. A top of the protrusion 127 and the sidewall 122 is received in the channel 144 in contact with the body 136 of the lid 104. The second ridge 146B extends beyond the top surface of the protrusion 127 to cover at least a portion of the sidewall 122. As shown in FIG. 3, an upper surface of the flange 154 is flat and planar and faces a flat and planar bottom surface of protrusion 127. In some embodiments, the first flange 154 and the protrusion 127 provide a liquid tight seal in the storage configuration shown, such that liquid in the bowl 102 will not leak out of the lid 104 when the bowl 102 and lid 104 are inverted. In one or more embodiments, the lid 104 creates a hermetic seal for the bowl 102. While a gasket may not be required to form a liquid tight or hermetic seal, some embodiments may include a gasket to further increase the seal between the lid 104 and bowl 102. The gasket may be coupled to the lid in the channels 144, 150 or to the sidewall 122 of the bowl 102.

Further, the first channel 144 and first ridges 146A, 146B have a size and shape to receive the ridge 128 and flange 134 of the bowl, such that the lid 104 can be coupled to a base of the bowl 102 via first channel 144 of the lid 104. Alternatively or additionally, the second channel 150 and second ridges 148A, 148B have a size and shape to receive at least a portion of the ridge 128 and the flange 134, such that the lid can be inverted or flipped over and secured to the base of the bowl 102 with the suction cup 142 facing an external surface (e.g., the surface on which the bowl 102 is resting). The ridge 128 and aperture 130 at the base of the bowl 102 provide clearance for receiving the lid 104, regardless of the orientation of the lid 104 relative to the bowl 102 (e.g., with suction cup 142 facing toward or away from bowl 102). As such, sidewall 122 of the bowl 102 is spaced from an external surface via ridge 128 and aperture 130 during normal use. In other words, sidewall 122 at the bottom surface 120 defining cavity 110 is raised from an external surface by ridge 128 in order to receive lid 104.

Figure 4:
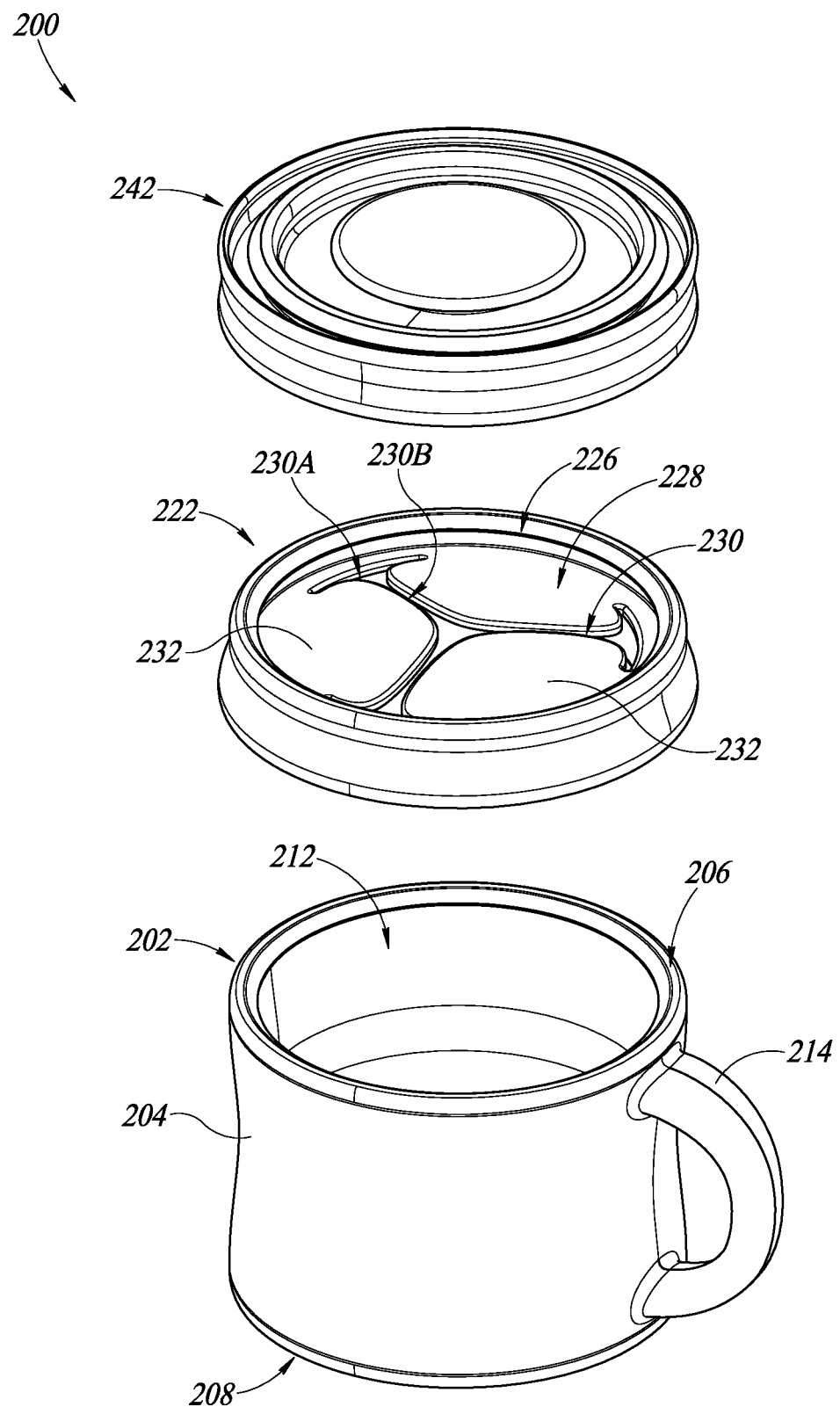
FIG. 4 is an exploded perspective view of the cup and two of the lids of FIG. 1.
Figure 5:
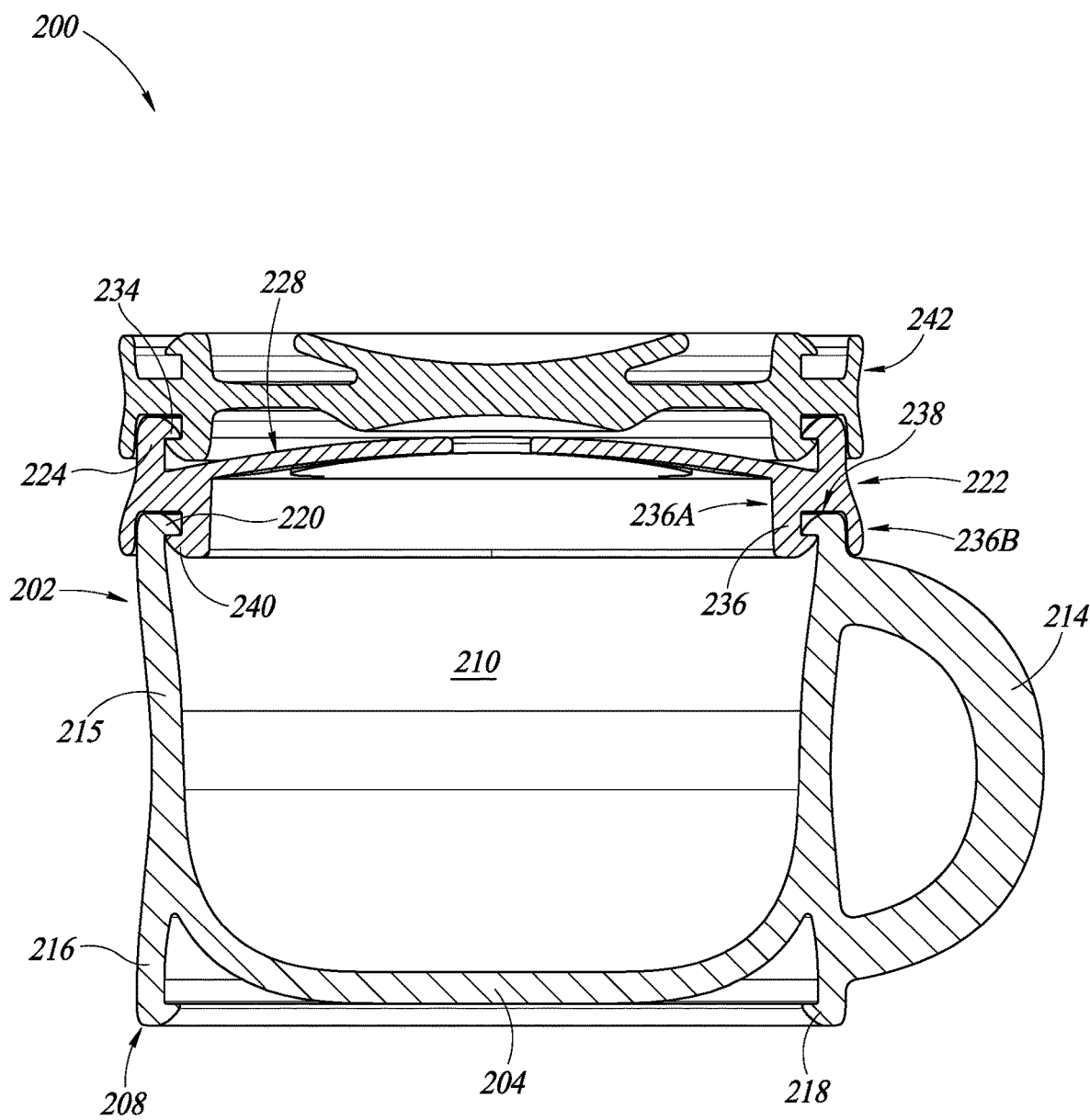
FIG. 5 is a diametric cross-sectional view of the cup and two of the lids of FIG. 1.

FIG. 4 is an exploded perspective view of the cup assembly 200 and FIG. 5 is a cross-sectional view of the cup assembly 200 in the storage configuration. With reference to FIGS. 4 and 5, the cup assembly 200 includes a cup 202 having a base 204 with a first surface 206 and a second surface 208 opposite the first surface 206. In some embodiments, the first surface 206 is a top surface and the second surface 208 is a bottom surface. The base 204 includes an internal cavity 210, such that the base 204 is configured to store one or more items. An opening 212 extends into the first surface 206 of the base 204 in fluid communication with the cavity 210. The cup 202 further includes a handle 214 coupled to and extending from the base 204. In some embodiments, a width or diameter of opening 212 is the same as a width or diameter of the cavity 210. In one or more embodiments, the width of the opening 212 is larger or smaller than the width of the cavity 210.

The cup 202 further includes a sidewall 215 defining the cavity 210, a ridge 216 extending from the sidewall 215, a first flange 218 extending from the ridge 216 and a second flange 220 extending from a top of sidewall 215. These features are similar to those described herein with respect to base 102 of bowl assembly 100 and as such, repetitive description has been omitted. In general, in some embodiments, the base 204 has the same or similar features as the base 102 of bowl assembly 100, except for the differences described herein, such as the handle 214. Further, the base 204 of the cup assembly 200 may have a height that is greater than a height of the base 102 of the bowl assembly 100, in some embodiments. Other dimensions of the base 204 of the cup assembly 200 may be different from base 102 of the bowl assembly 100 as well. In one or more embodiments, the height of the base 204 of the cup assembly 200 is the same as the height of the base 102 of the bowl assembly 100.

The cup assembly 200 further includes a first lid 222. In the storage configuration shown in FIG. 5, the first lid 222 is coupled directly to the base 204 of the cup assembly 200. The first lid 222 includes a sidewall 224 around an opening 226. A flexible portion 228 is coupled to and extends from the sidewall 224 across opening 226. In other words, the flexible portion 228 covers the opening 226 and extends around an entire periphery of sidewall 224, in some embodiments. The flexible portion 228 further includes at least one slit 230 through the flexible portion 228. In the illustrated embodiment, there are three slits 230 through the flexible portion 228, with the slits 230 spaced equidistant about each other, with each slit 230 intersecting a center of the flexible portion 228 and lid 222. In one or more embodiments, there are more or less than three slits 230. For example, there may be only one slit 230, only two slits 230, or more than three slits 230, such as four, five, six, seven, eight, or more slits 230.

The slits 230 define flexible protrusions or sections 232 of the flexible portion 228. In operation, the protrusions 232 provide access to opening 226 by bending, deflecting, or rotating out of position when an upward or downward force is applied by a user's hand. As described herein, the flexible portion 228 and protrusions 232 are formed of a resilient material such as silicone, food grade silicone, or other like materials. As such, the protrusions 232 can be bent to provide access to opening 226 upon application of a force, but will return to the illustrated position when the force is removed. Each of the slits 230 has a first portion 230A and a second portion 230B. In some embodiments, each of the first and second portions 230A, 230B is perpendicular to each other and each of the second portions 230B of the slits 230 intersect at a center of the first lid 222. Further, edges of the protrusions 230 may be rounded in order to improve the tactile response to the user and decrease the likelihood of injury due to contact with sharp edges. As such, each of the protrusions 230 may generally have a rounded shape similar to a spade, with a width proximate the sidewall 224 that is less than a width across a center of the protrusion 230 and greater than a width at the tip of the protrusion 230. Other configurations of the slits are contemplated herein, so long as the configuration provides access through opening 226 of the first lid 222.

As shown more clearly in FIG. 5, the first lid 222 further includes similar features to lid 104 for attachment to the base 204 of the cup 202. For example, the first lid 222 has a first flange or protrusion 234 extending radially inward from a top of sidewall 224 of the first lid 222. The first lid 222 further includes a ridge 236 extending from a bottom of the sidewall 224 and a channel 238 in the ridge 236. The channel 238 divides the ridge 236 into a first portion 236A and a second portion 236B. A second flange 240 extends radially outward from the first portion 236A. In other words, the second flange 240 extends away from first portion 236A and into the channel 238 toward the second portion 236B of the ridge 236. As shown in FIG. 5, the channel 238 has a size and a shape to receive the top of the sidewall 215 and the second flange 220 extending from the top of the sidewall 215 of the cup 202. The second flange 220 of the cup 202 is in contact with the second flange 240 of the first lid 222.

Figure 11:
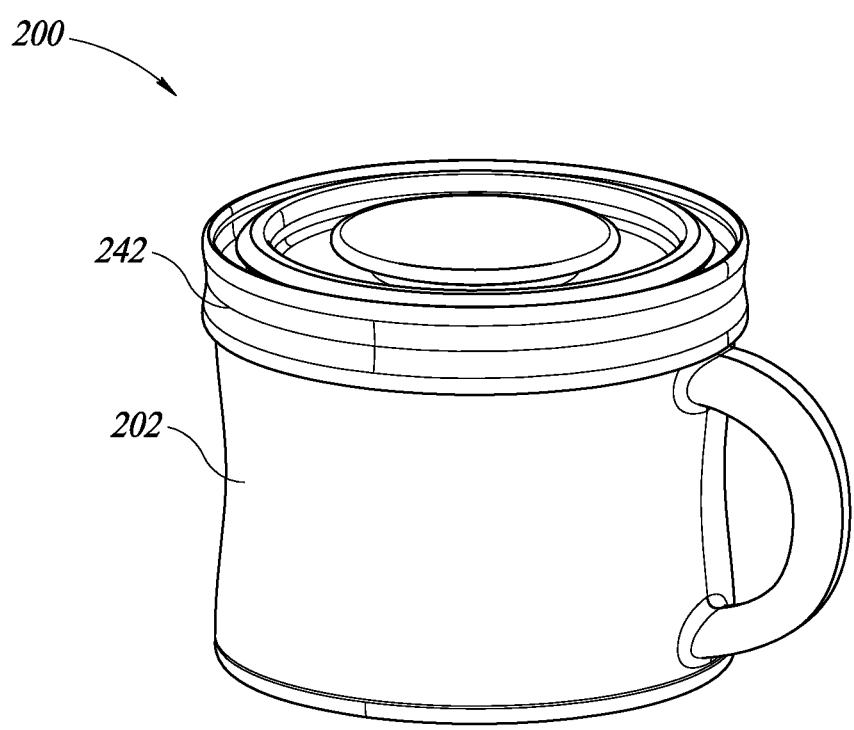

The cup assembly 200 further includes a second lid 242 coupled directly to the first lid 222 in the storage configuration. The second lid 242 may be identical or substantially similar to lid 104 described above with reference to bowl assembly 100. As such, the second lid 242 is configured to receive and secure the first flange 234 of the first lid 222 in order to seal the cup assembly 200. More specifically, the second lid 242 covers the opening 226 and the slits 230 of the first lid 222, in order to keep food or other items from escaping when the assembly 200 is in the storage configuration shown in FIG. 5. The second lid 242 can also be secured directly to the base 204 of the cup 202, as illustrated in FIG. 11. Further, each of the cup 202, the first lid 222, and the second lid 242 may be circular or cylindrical, in some embodiments. In one or more embodiments, the cup 202, the first lid 222, and the second lid 242 may be any other shape, such as square or rectangular, among others.

Figure 6:
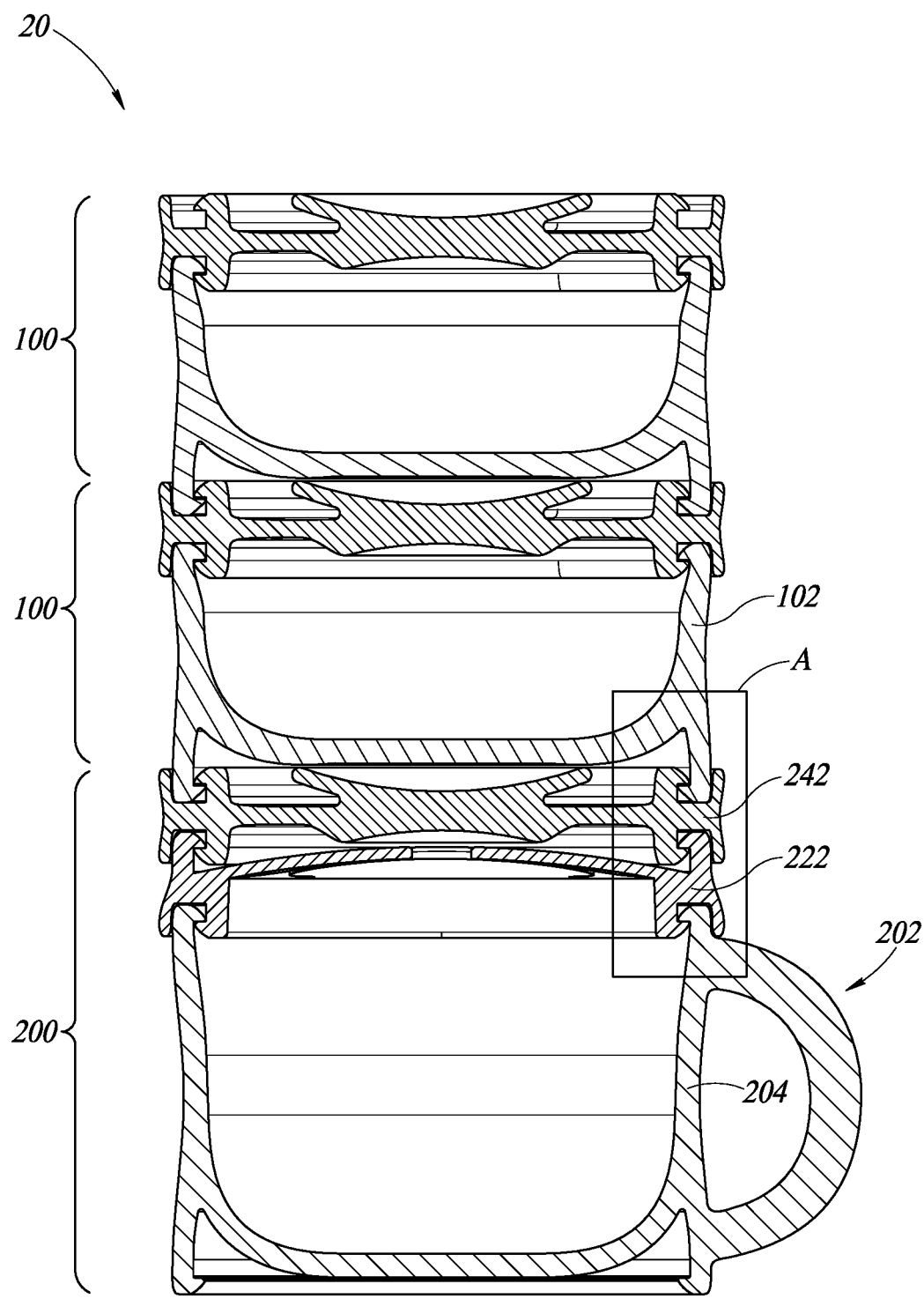
FIG. 6 is a diametric cross-sectional view of the modular storage system of FIG. 1.
Figure 7:
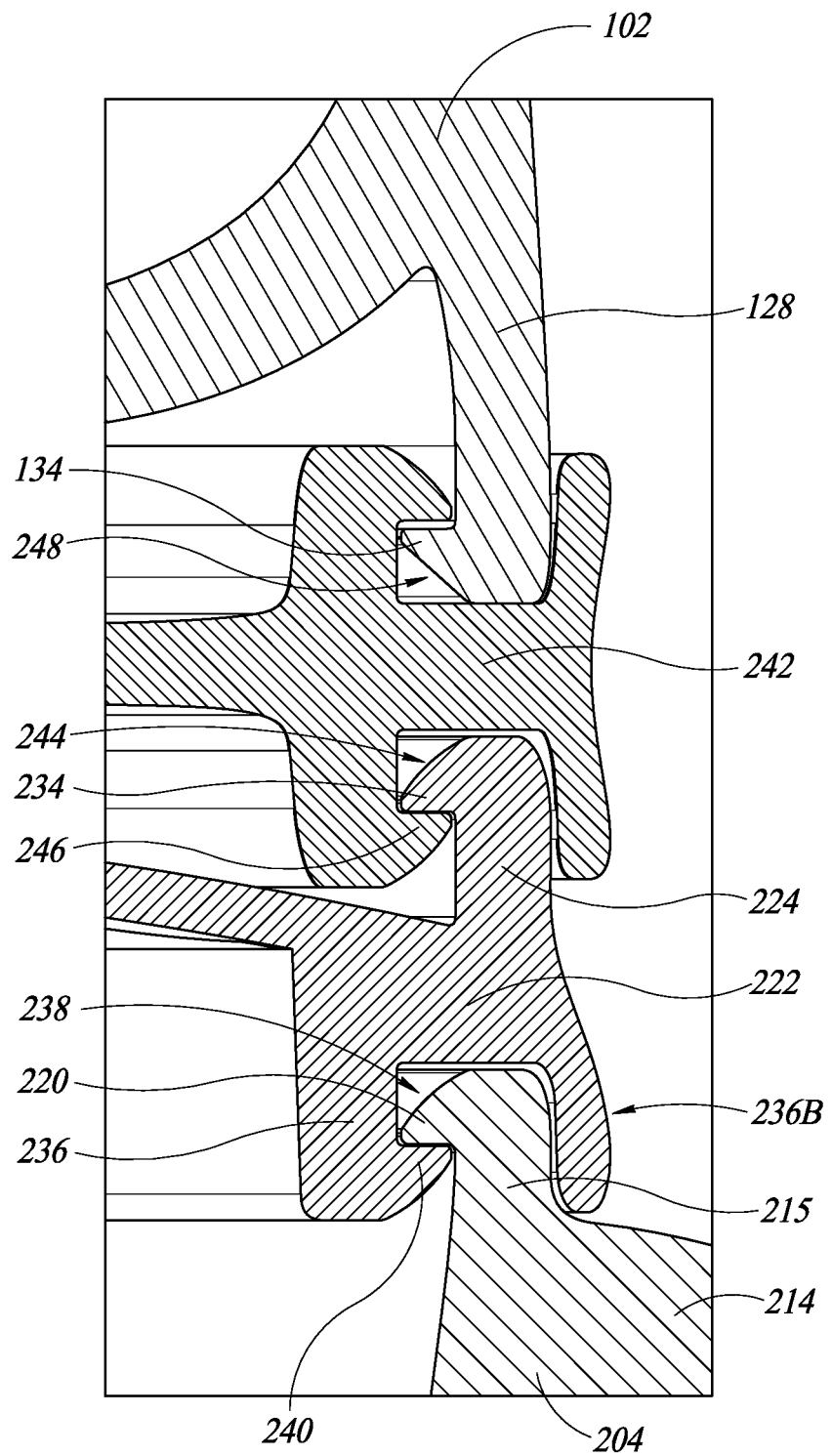
FIG. 7 is a detailed cross-sectional view of a connection between the cup, two lids, and a bowl of FIG. 6.

FIG. 6 is a cross-sectional view of the storage assembly 20 and FIG. 7 is a detailed view of window A in FIG. 6 showing more detail of the connection between various components described herein. Specifically, FIGS. 6 and 7 illustrate the connection between the base 102 of the bowl assembly 100 and the first lid 222, the second lid 242, and the base 204 of the cup assembly 200 as a representative of the connection between each of the modular components described herein.

With reference to FIGS. 6 and 7, the base 204 of the cup 202 includes the second flange 220 extending from the top of sidewall 215 of the base 204. The second flange 220 and the top of the sidewall 215 of the base 204 of the cup 202 is received in the channel 238 of the first lid 222 with a lower surface of the second flange 220 facing and in direct contact with an upper surface of the second flange 240 of the first lid 222. Further, in one or more embodiments, the second flange 220 of the base 204 is received in channel 238 in a friction fit. The second flange 220 of the base 204 has a rounded outer surface facing the first lid 222 in order to reduce sharp edges and the risk of injury therefrom when the first lid 22 is removed from the base 204. As such, there is a space or gap between the rounded portion of the outer surface of second flange 220 of the base 204 and the first lid 222 and ridge 236, in some embodiments. In one or more embodiments, the surface of the second flange 220 of the base 204 of the cup 202 facing the second flange 240 of the first lid 222 is flat and planar. Further, in some embodiments, the surface of the second flange 240 of the first lid 222 facing the second flange 220 of the base 204 is flat and planar. As such, the flanges described herein can each have a flat and planar portion facing each other as well as a rounded or curved outer portion to improve tactile response to a user in the storage configuration.

Further, the second portion 236B of the ridge 236 of the first lid 222 extends toward handle 214. In other words, a height of the second portion 236B of the ridge 236 is equal to, or similar to (e.g., within 5 millimeters) of a height of the sidewall 215 of the base 204 beyond the handle 214. As such, a location or position of the handle 214 relative to the base 204 is selected to accommodate the second portion 236B of the ridge 236, in some embodiments. In one or more embodiments, the position of the handle 214 is selected to provide a gap or space between a bottom surface of second portion 236B of ridge 236 and the handle 214. In one or more embodiments, the second portion 236B of ridge 236 is adjacent to or in direct contact with handle 214.

The second lid 242 further includes a first channel 244 and a first flange 246 extending radially inward from the second lid 242 into first channel 244. The first channel 244 of the second lid 242 has a size and shape similar to channel 238 of the first lid 222 and the first flange 234 of the first lid 222 has a similar size and shape to second flange 220 of the base 204 of the cup 202, such that the first flange 234 of the first lid 222 is received in the first channel 244 of the second lid 242 in a similar manner to that described above with respect first lid 222 and base 204 of cup 202. The second lid 242 further includes a second channel 248 opposite the first channel 244 across a thickness of the second lid 242, with a similar size and shape to the first channel 244. The second channel 248 is shaped to receive the flange 134 extending from ridge 128 of the base 102 of the bowl assembly 100, which is similar in size and shape to the first flange 234 of the first lid 222.

As shown in FIG. 7, the sidewall 215 of the base 204 of the cup 202, the sidewall 224 of the first lid 222, and the ridge 128 of the base 102 of the bowl assembly 100 are aligned in the storage configuration shown to provide balance and stability to the assembly 20. Moreover, because each of the channels, ridges, and flanges described herein have a similar size and shape in some embodiments, the lids, bowls, and cups can be used interchangeably with each other. In one non-limiting example, the first lid 222 of the cup assembly 200 can be coupled to the base 102 of the bowl assembly 100. In another non-limiting example, the lid 104 of the bowl assembly 100 can be coupled to the top or bottom of the base 204 of the cup assembly 200. Other potential configurations, including any possible coupling between the bowls, lids, and cups of the present disclosure are expressly contemplated herein.

FIGS. 8-11 are perspective views of various use configurations to provide more detail regarding the functionality of the embodiments described herein. Although FIGS. 8-11 illustrate configurations of cup assembly 200, it is to be appreciated that the configurations described herein apply equally to the bowl assembly 100. In other words, the lids of the cup assembly 200 can be used in a similar manner with the bowl assembly 100, and the lid of the bowl assembly 100 can be used with the cup assembly 200.

Figure 8:
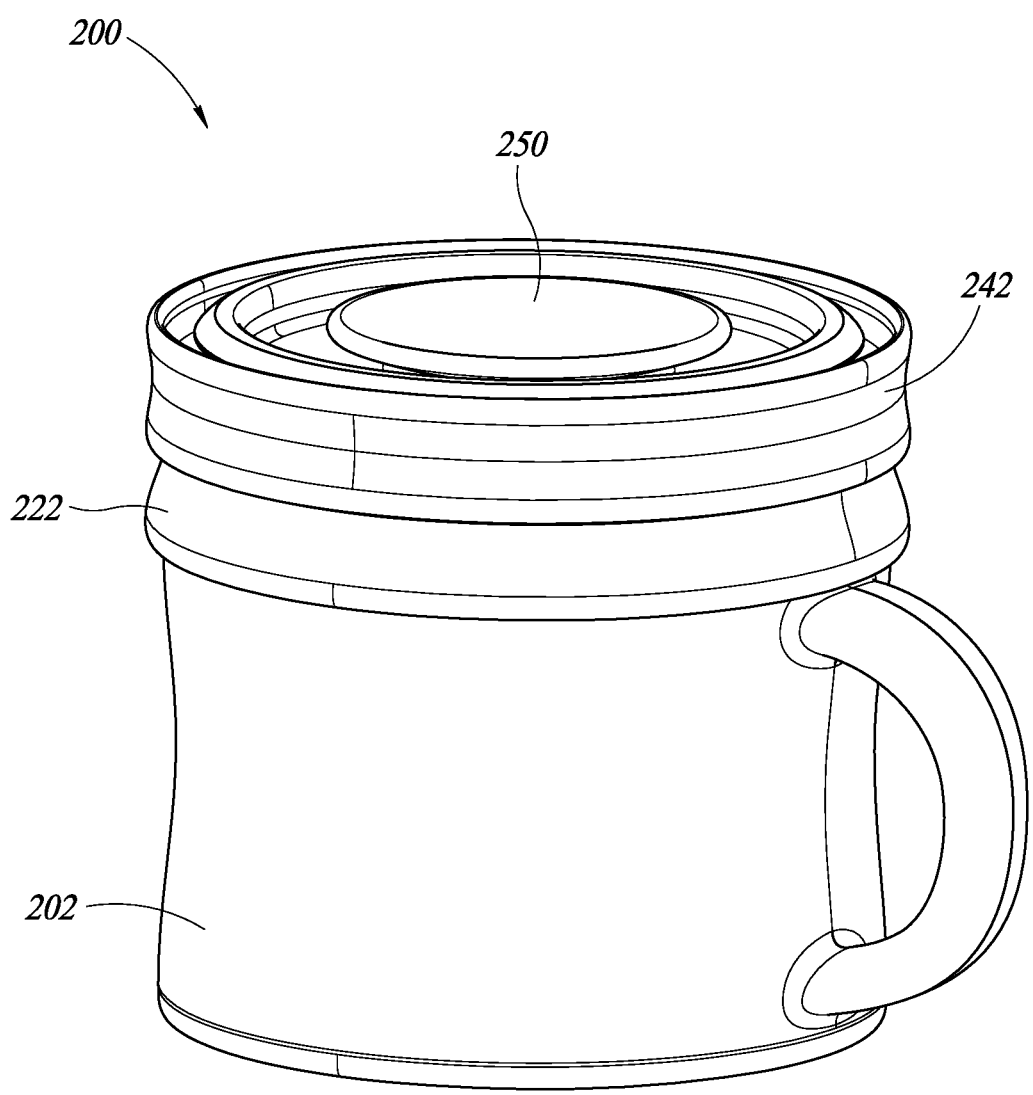
FIGS. 8-11 are views illustrating various use configurations of the cup and lids of the system of FIG. 1.

FIG. 8 illustrates a perspective view of the cup assembly 200 in the storage configuration with the first lid 222 coupled directly to the cup 202 and the second lid 242 coupled directly to the first lid. The second lid 242 is solid, meaning in this non-limiting example only, that there are no holes, apertures, or openings through the body of the second lid 242. As such, the second lid 242 seals the assembly 200 and prevents materials stored in cup 202, which may be liquid or solid, from leaving the cup through first lid 222. In other words, the second lid 242 covers the flexible portion 228 of the first lid 222 to block access to opening 226 through the first lid 222, thereby sealing the assembly 200. The second lid 242 includes a suction cup 250 extending from the second lid, similar to suction cup 142 described herein with respect to bowl assembly 100.

Figure 9A:
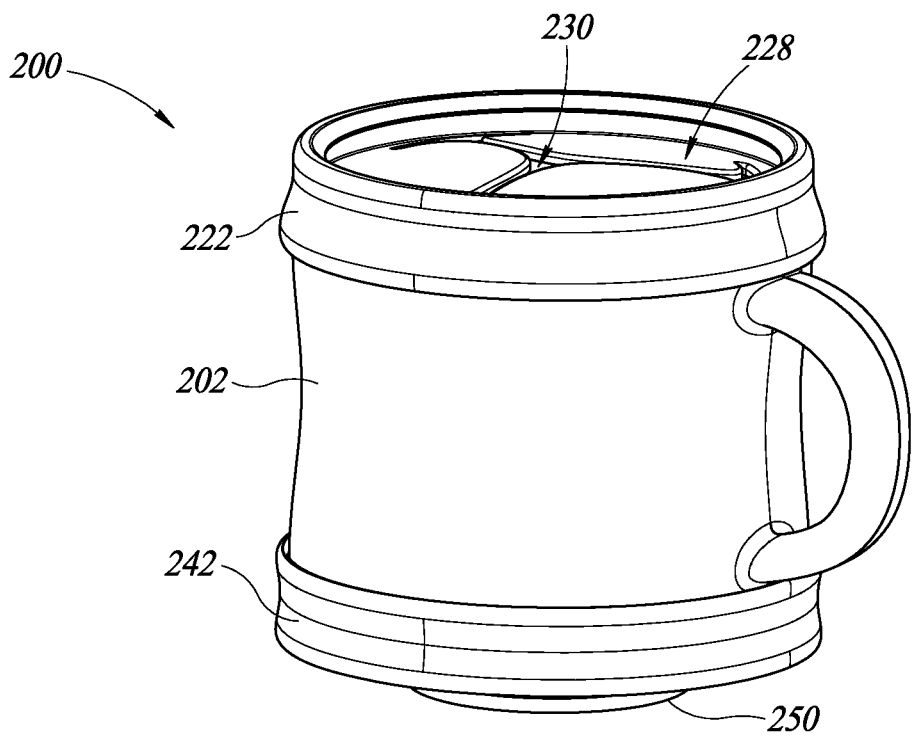
Figure 9B:
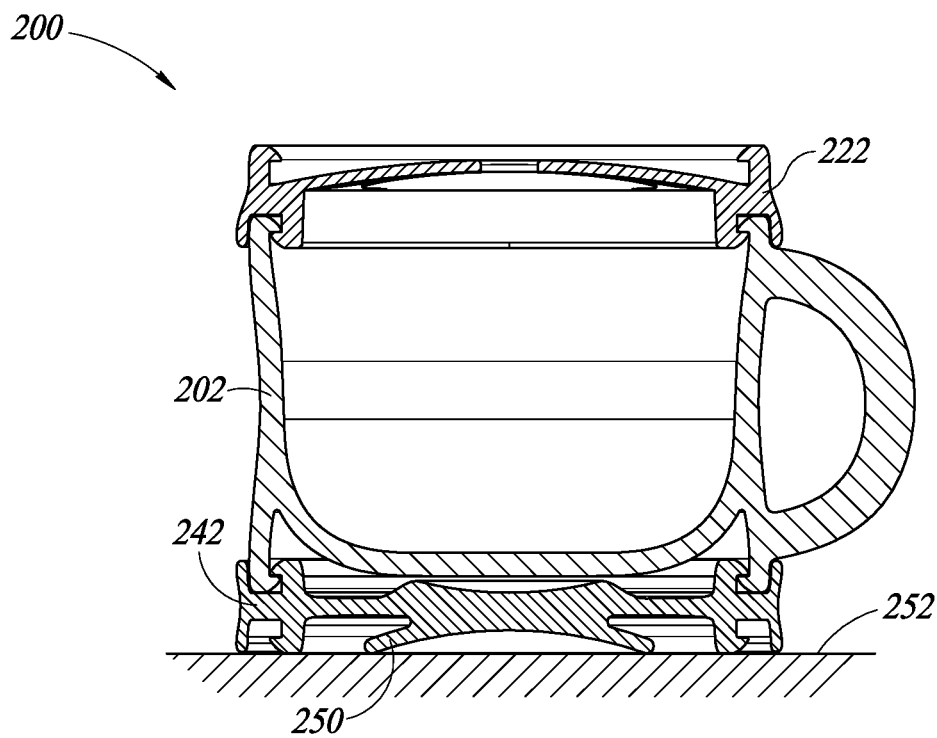

FIG. 9A is a perspective view of the cup assembly 200 with the second lid 242 secured to the bottom of the cup 202. FIG. 9B is a cross-sectional view showing the second lid secured to the cup 202 in more detail. In one use configuration, the user manipulates the assembly 200 in the storage configuration shown in FIG. 8 by removing the second lid 242 from the first lid 222. The user then inverts the second lid 242, meaning that the user turns the second lid 242 over so that the suction cup 250 faces an external surface 252. Then, the user secures the second lid 242 to external surface 252 by applying a generally downward force on the second lid 242, which engages suction cup 250 with the surface 252. More specifically, the downward force on the second lid 242 expels gas out of the concavity in the suction cup 250, while also creating a seal between the suction cup 250 and surface 252. The expulsion of gas, in combination with the sealing effect, creates a vacuum (e.g., negative pressure) in the concavity that secures the suction cup 250 to the surface 252. The user then attaches the cup 202 to the second lid 242, such that the cup 202 and the first lid 222 are temporarily fixed to the surface 252.

Securing the cup 202 to the surface 252 via suction cup 250 prevents the cup 202 from tipping over when the cup 202 is in use. For example, where the cup assembly 200 is used to hold snacks for a young child, the suction cup 250 prevents the child from knocking over the cup 202 and spilling the snacks in the cup 202. The same applies where the cup 202 holds liquid or gelatinous foods. Further, the assembly 200 is illustrated in FIG. 9A with the second lid 222 open, such that the user can insert their hand through slits 230 in flexible portion 228 to access the contents of the cup 202. In one non-limiting example where the cup 202 stores snacks for children, the flexible portion 228 and slits 230 further provide an anti-spill functionality, as even if the suction cup 250 is removed from the surface 252 and the cup 202 is knocked over, the flexible portion 228 will retain solid snacks. In other words, the size of the slits 230 is small enough and the resiliency of the flexible portion 228 is great enough that solid foods can be retained in cup 202 even when it is knocked over. Furthermore, the flexible portion 228 prevents snacks that are dropped by a child in the cup 202 from spilling outside of the cup 202.

Figure 10A:
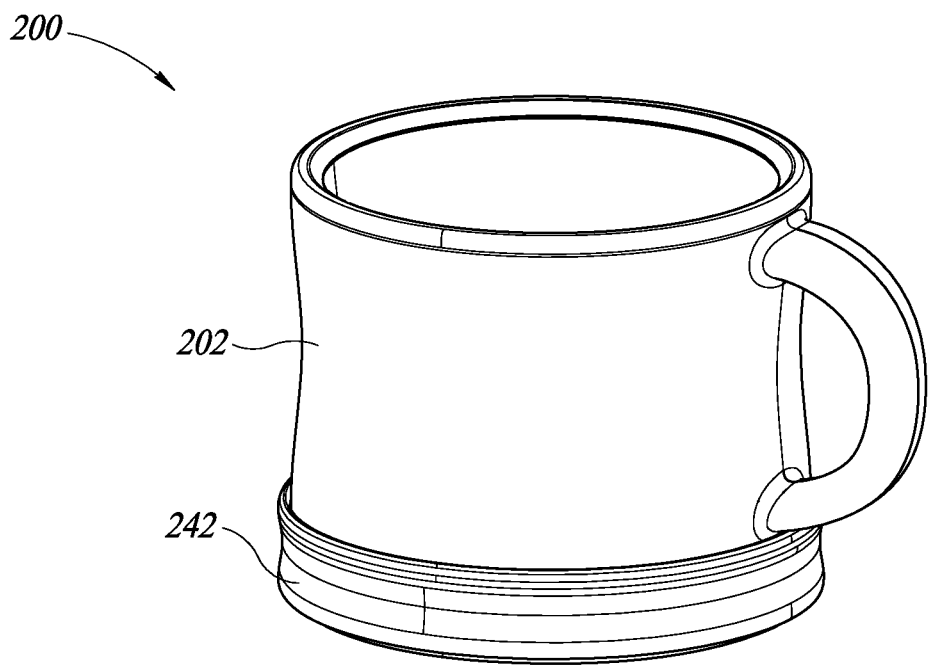
Figure 10B:
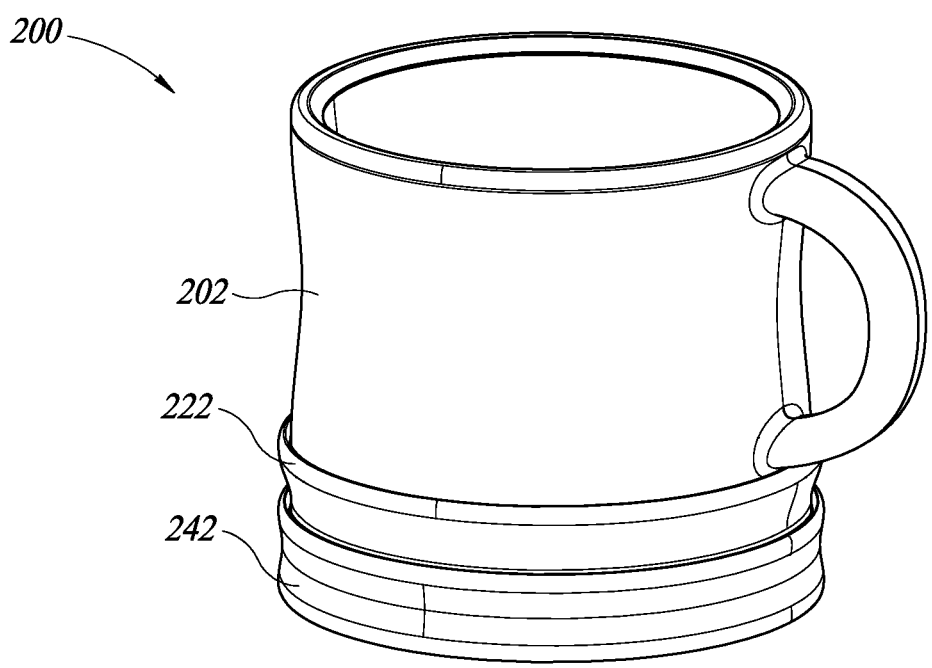

FIGS. 10A and 10B illustrate use and storage configurations of the first lid 222. FIG. 10A is similar to FIG. 9A, except the first lid 222 has been removed from the cup 202 and stored external to assembly 200, such as in a user's bag if on the go or cupboard if at home. In this configuration, the cup 202 can be used as a bowl, such as for storage and access to liquid or gelatinous foods. Alternatively, the first lid 222 may be stored as part of the assembly 200, as shown in FIG. 10B. In FIG. 10B, the first lid 222 is coupled to the bottom of the cup 202, between the cup 202 and second lid 242. As such, the first lid 222 can be stored in assembly 200 without interfering with the suction cup 252 (see FIG. 9B).

FIG. 11 illustrates a use configuration of the assembly 200 wherein the second lid 242 is coupled directly to the cup 202, without the first lid 222. This configuration may be advantageous when only liquid or gelatinous foods are stored in the cup 202, or where a child is old enough that the first lid 222 is no longer needed. In this configuration, the cup assembly 200 is similar to the bowl assembly 100 described herein.

Figure 12:
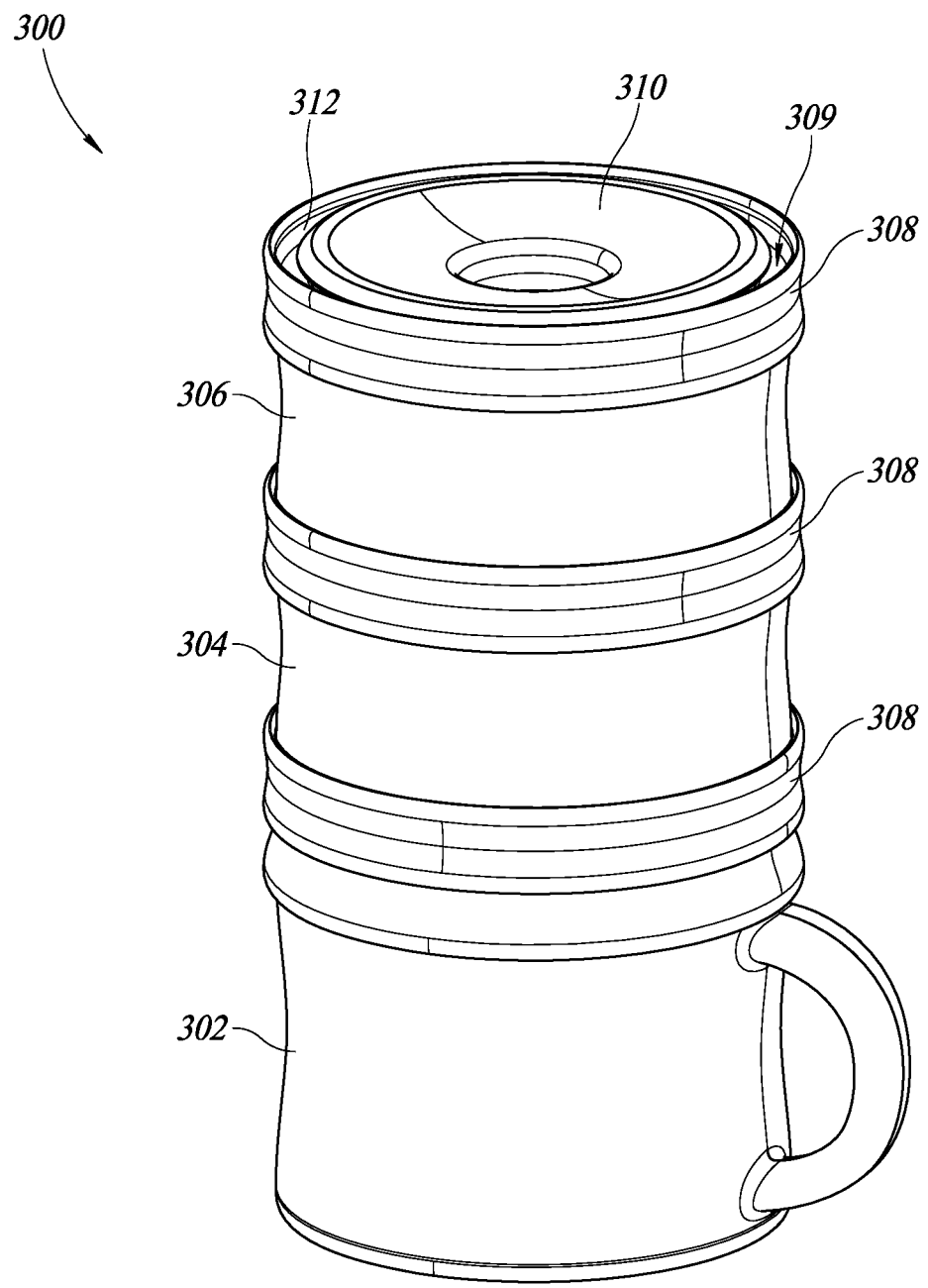
FIG. 12 is a top perspective view of an embodiment of a modular storage system.

FIG. 12 illustrates a modular storage system 300. The modular storage system 300 is similar to the storage assembly 20 described herein, except as otherwise noted. The storage system 300 includes a cup 302, a first bowl 304, and a second bowl 306 and a plurality of lids 308 arranged in a stacked configuration, as described herein. Each of the lids 308 may be structurally identical and include a suction cup 310 extending from a top surface 309 of the lid 308. The suction cup 310 is larger in diameter than the suction cups described with reference to assembly 20. As shown in FIG. 12, the suction cup 310 extends to a ridge 312 of each lid 308, such that there is little or no aperture or gap between the suction cup 310 and the ridge 312. More specifically, the suction cup 310 extends through aperture 152 described above with reference to bowl assembly 100 (see FIG. 3). As such, the suction cup 310 and part of the ridge 312 are a single, unitary, integral component, in some embodiments. Put another way, the suction cup 310 forms a sidewall of a channel for securing the lids 308 to the bowls 304, 306, and the cup 302, or to other lids 308.

The larger size of the suction cup 310 increases the suction force to further secure the cup 302 or bowls 304, 306 to an external surface, as described herein. More specifically, increasing a size of the suction cup 310 increases the volume of the vacuum of the suction cup 310 when the suction cup 310 is applied to a surface. The increased volume of vacuum increases the force required to unseat the suction cup 310, or increases the suction force.

Figure 13:
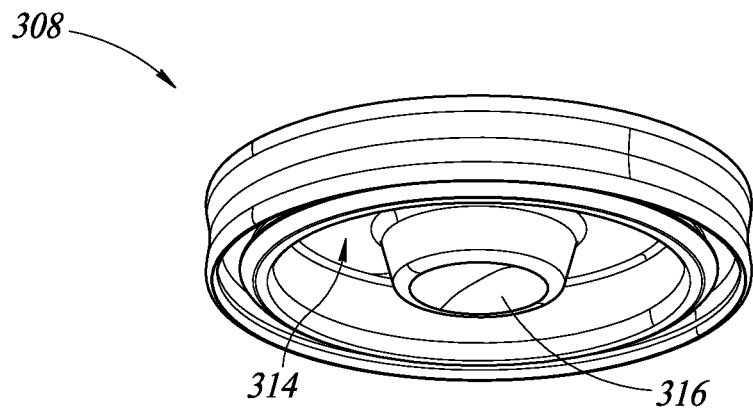
FIG. 13 is a bottom perspective view of a lid of the modular storage system of FIG. 12.
Figure 14:
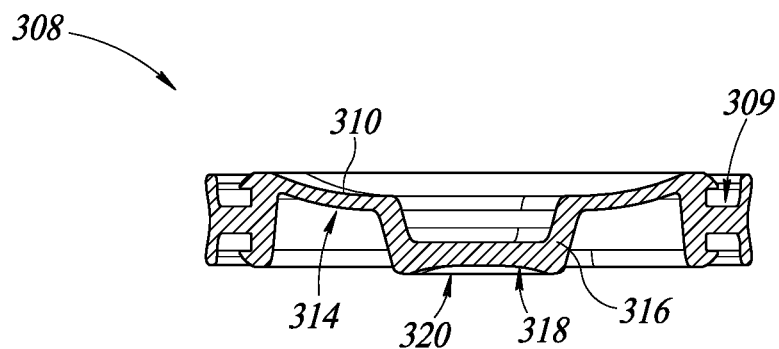
FIG. 14 is a diametric cross-sectional view of the lid of FIG. 13.

FIG. 13 illustrates a bottom perspective view of one of the lids 308 and FIG. 14 is a cross-sectional view of one of the lids 308. Each lid 308 includes a bottom surface 314 and a tower 316 extending from the bottom surface 314. The tower 316 is cylindrical in shape and hollow, in some embodiments. Further, the tower 316 is centered with respect to, and forms part of the suction cup 310, in one or more embodiments. The tower 316 increases the vacuum volume to further increase the suction force of suction cup 310, among other advantages described herein. In one or more embodiments, the tower 316 includes a bottom surface 318 with a depression or cavity 320 in the bottom surface 318 to give the tower 316 a concave appearance at the bottom surface 318.

Figure 15:
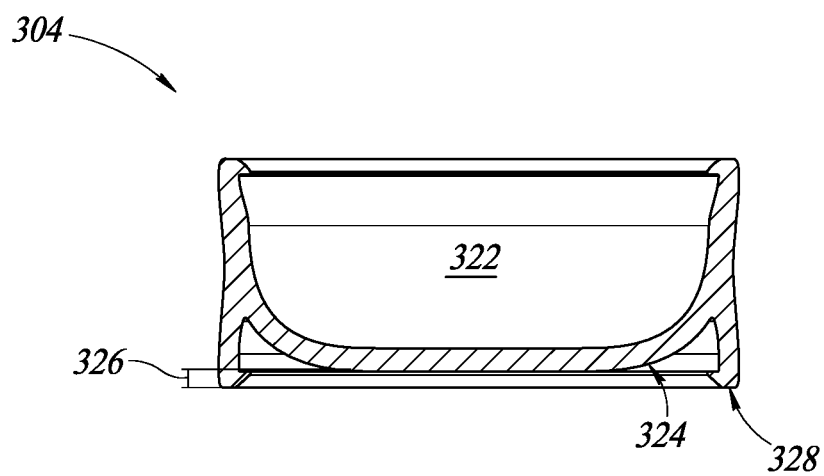
FIG. 15 a diametric cross-sectional view of a bowl of the storage system of FIG. 12.

FIG. 15 illustrates a cross-sectional view of the first bowl 304. The second bowl 306 is similar to first bowl 304, if not identical, in some embodiments, and as such, repetitive description has been omitted. The first bowl 304 has an internal cavity 322 with a volume that is the same as the volume described with respect to bowl assembly 100 (see FIGS. 2 and 3). However, a height 326 between a bottom 324 of the cavity 322 and a bottommost surface 328 of the first bowl 304 has been decreased in order to provide interaction with the tower 316, as described below. In some embodiments, the height 326 is between 3 and 4 mm less than the bowl assembly 100. In addition to advantages with respect to the tower 316, the decrease in height also allows the system 300 to take up less space in storage, while still retaining the same volume for storage of items.

Figure 16:
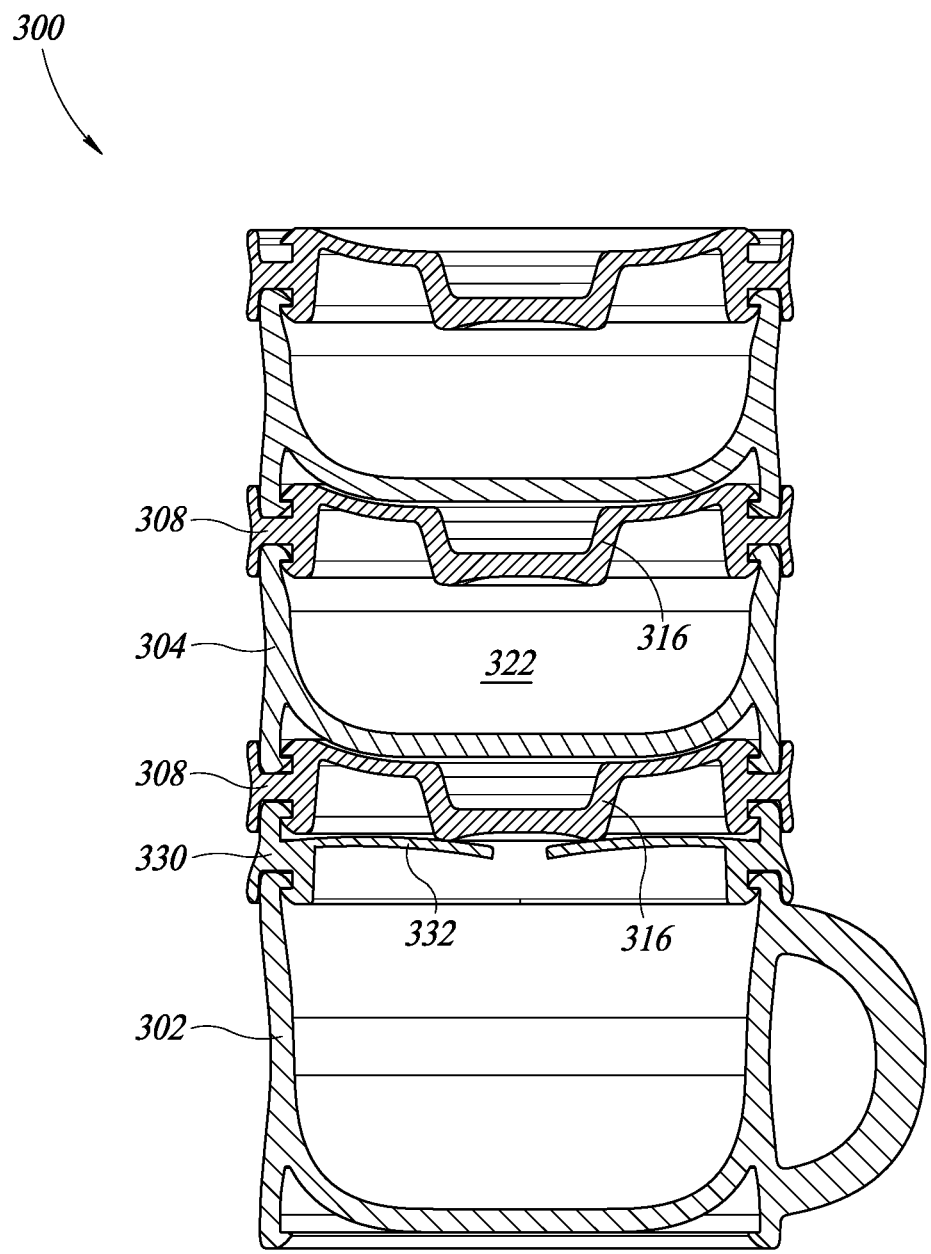
FIG. 16 is a diametric cross-sectional view of the storage system of FIG. 12.

FIG. 16 is a cross-sectional view of the system 300 in the storage or stacked configuration. The tower 316 of a first one of the lids 308 extends into the cavity 322 of the first bowl 304. Further, the cup 302 includes a second lid 330 between the cup 302 and lid 308, which may be similar to first lid 222 described herein with reference to cup assembly 200. The tower 316 of the lid 308 attached to the cup 302 extends to deflect a flexible portion 332 of the second lid 330. As described above, the flexible portion 332 is silicone, or some other flexible and resilient material, such that deflection of the flexible portion 332 does not create long term issues, such as permanent deformation of flexible portion 332. Put another way, the tower 316 of the lid 308 associated with the cup 302 extends into contact with, and extends at least partially through, the flexible portion 332 of second lid 330, in some embodiments.

Figure 17A:
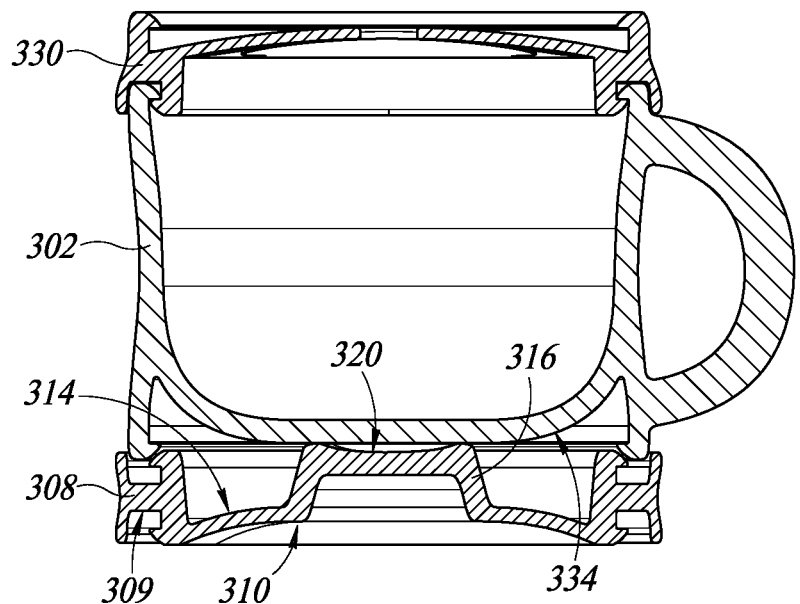
FIGS. 17A and 17B are diametric cross-sectional views illustrating use configurations of the storage system of FIG. 12.
Figure 17B:
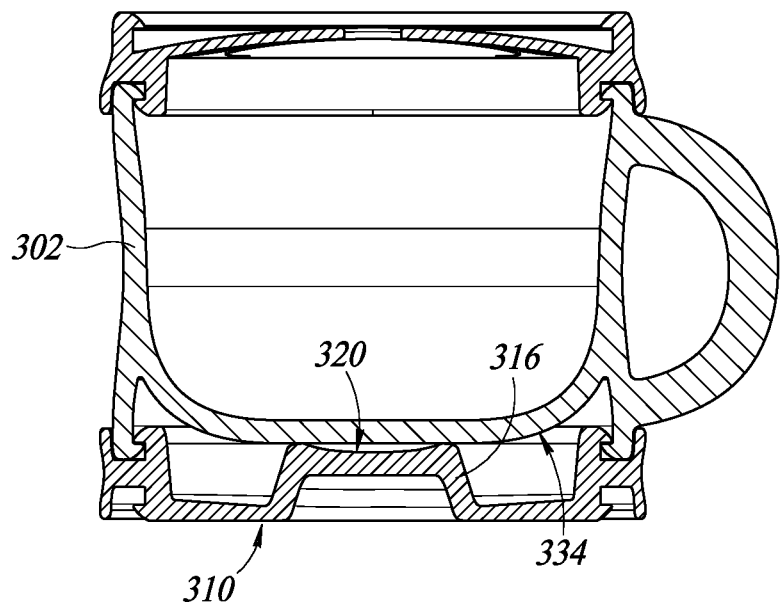

FIGS. 17A and 17B are cross-sectional views of the cup 302, lid 308, and second lid 330 illustrating various use configurations. In use and with reference to FIG. 17A, the user removes the lid 308 from the second lid 330 and inverts the lid 308, such that the tower 316 faces a bottom 334 of the cup 302. In other words, in use, the bottom surface 314 of the lid 308 faces the cup 302, and the suction cup 310 and first surface 309 face an external surface. The geometry of the cup 302 and tower 316 are such that the tower 316 has a height that is greater than height 326 described with reference to FIG. 15, which applies equally to cup 302. As such, the tower 316 is in contact with the bottom surface 334 of the cup 302 as the user attaches the cup 302 to the lid 308.

The user then presses the cup 302 down to secure the cup 302 to the lid 308, as described herein and shown in more detail in FIG. 17B. With the downward force, the bottom surface 334 of cup 302 contacts and acts on tower 316, which is connected to suction cup 310. As such, the downward force flattens the suction cup 310 and secures the suction cup 310 to an external surface. In other words, the tower 316 engages the suction cup 310 to an external surface when the cup 302 (or one of the bowls 304, 306) are assembled and then pressed onto a surface. As such, the user can attach the lid 308 to the cup 302 prior to setting the cup 302 on a surface. Once the cup 302 and lid 308 are pressed onto a surface, the tower 316 activates the suction cup 310 to secure the cup 302. Alternatively, the user can first set the lid 308 on a surface with the suction cup 310 facing the surface. Then, the user can attach the cup 302 to the lid 308, which again, will activate suction cup 310 via tower 316.

In some embodiments, applying the force to the cup 302 creates an additional suction force between cavity 320 in the tower 316 and the bottom surface 334 of the cup 302, which further stabilizes the cup 302. The same process described above for FIGS. 17A and 17B can be used to attach either of the bowls 304, 306 to a surface, either with cup 302 in a stacked configuration, or separate and apart from cup 302. As such, the geometry of the system 300 allows for increased functionality of the lids 308, the cup 302, and bowls 304, 306.

Figure 18:
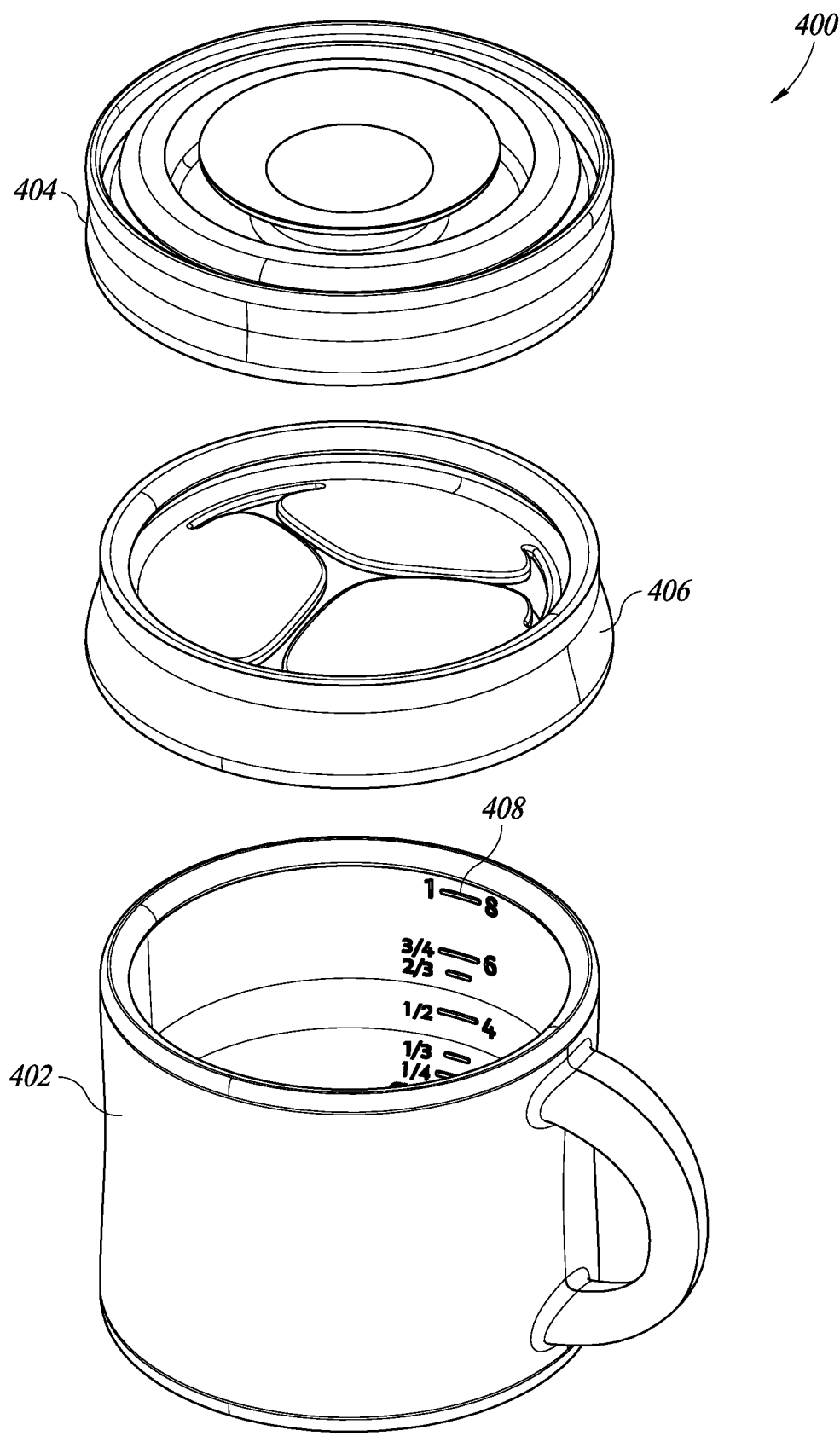
FIG. 18 is an exploded perspective view of an embodiment of a modular storage system including a first receptacle, a first lid, and a second lid.

FIG. 18 is an exploded perspective view of an embodiment of a modular storage system 400. The modular storage system 400 may be similar to any of the other systems described herein, except as otherwise explained below. The system 400 includes a first receptacle 402, a first lid 404, and a second lid 406 with the first and second lids 404, 406 structured to be interchangeably coupleable to the first receptacle 402 and each other, as described herein. The first receptacle 402 may be a cup that includes an inside surface with volume or measurement indicators 408. As shown in FIG. 18, the first receptacle 402 may be a cup with an eight-ounce or one-cup capacity and the number and denomination of the indicators 408 may be selected according to design factors and the volume of the first receptacle 402.

Figure 19:
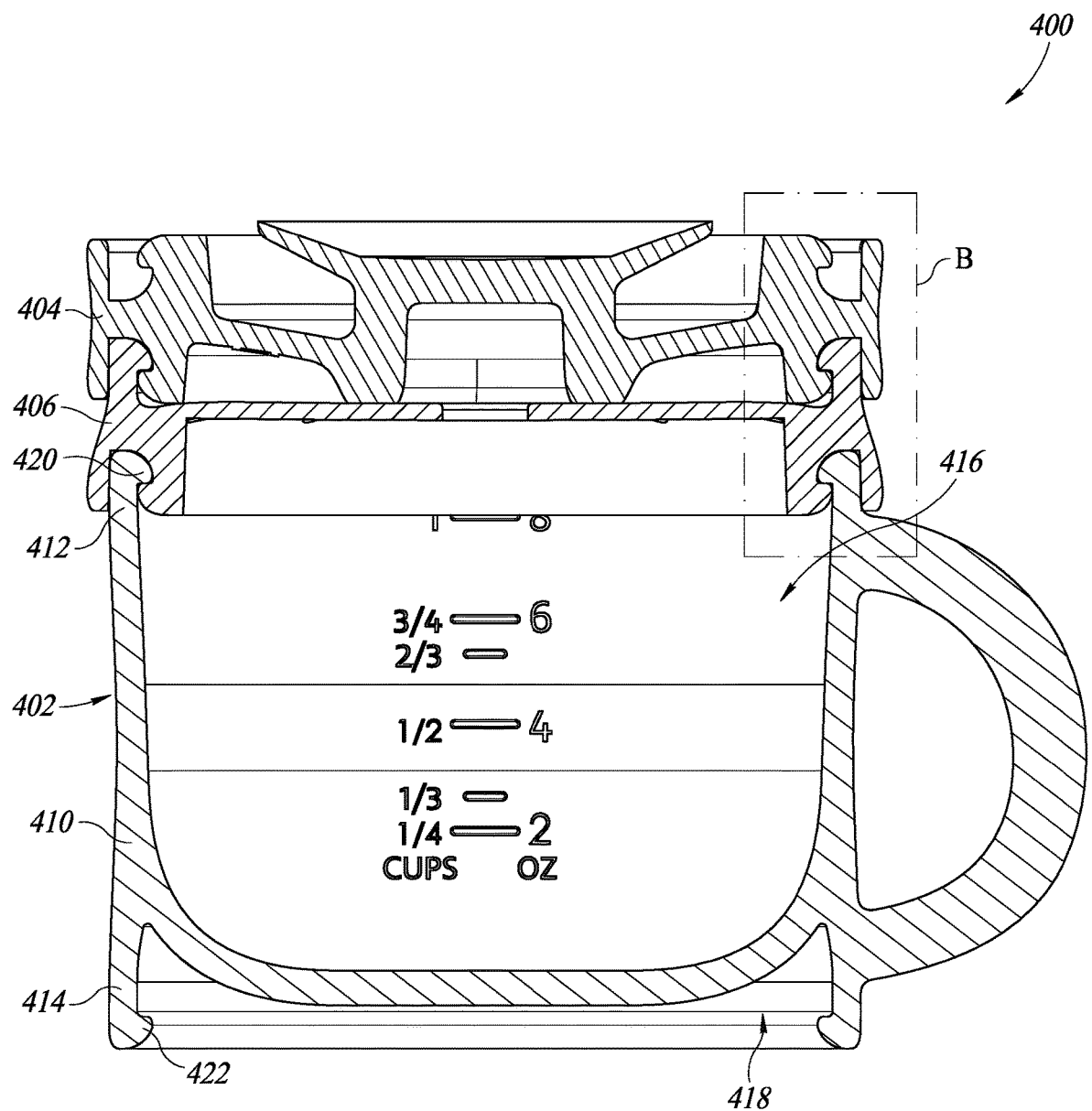
FIG. 19 is a diametric cross-sectional view of the modular storage system of FIG. 18.

FIG. 19 is a diametric cross-sectional view of the modular storage system 400 in an assembled, storage configuration. In the storage configuration, the second lid 406 is coupled to the first receptacle 402 and the first lid 404 is coupled to the second lid 406 to restrict access to the first receptacle 402 and minimize or prevent food or liquid from spilling out of the first receptacle 402. The first receptacle 402 includes a body 410 with a first end 412 and a second end 414 opposite the first end 412. The first end 412 may also be referred to herein as a first portion 412, an upper end 412, or a top end 412 of the body 410. Similarly, the second end 414 may also be referred to herein as a second portion 414, a lower end 414, or a bottom end 414 of the body 410. In the illustrated embodiment, the first and second lids 404, 406 are coupled to the first end 412 of the body 410 of the receptacle 402.

The first receptacle 402 further includes a first cavity 416 (which may also be referred to herein as a first opening 416) in the first end 412 of the body 410 and a second cavity 418 (which may also be referred to herein as a second opening 416) in the second end 414 of the body 410. The first and second cavities 416, 418 are separated from each other by the body 410, and specifically, by a bottom surface or bottom portion of the body 410, as shown in FIG. 19. The first cavity 416 is sized and shaped to receive one or more food items in solid or liquid form. The body 410 of the receptacle 402 further includes a first lip 420 at the first end 412 and a second lip 422 at the second end 414. In some embodiments, the first and second lips 420, 422 extend around an entirety of the circumference of the first and second cavities 416, 418 respectively. Further, the first and second lips 420, 422 extend away from an outer surface of the body 410 and into the first and second cavities 416, 418, respectively. The lips 420, 422 assist with the interchangeable coupling of the lids 404, 406 to the receptacle 402 and can differ in shape from the other similar structures described herein.

Figure 20:
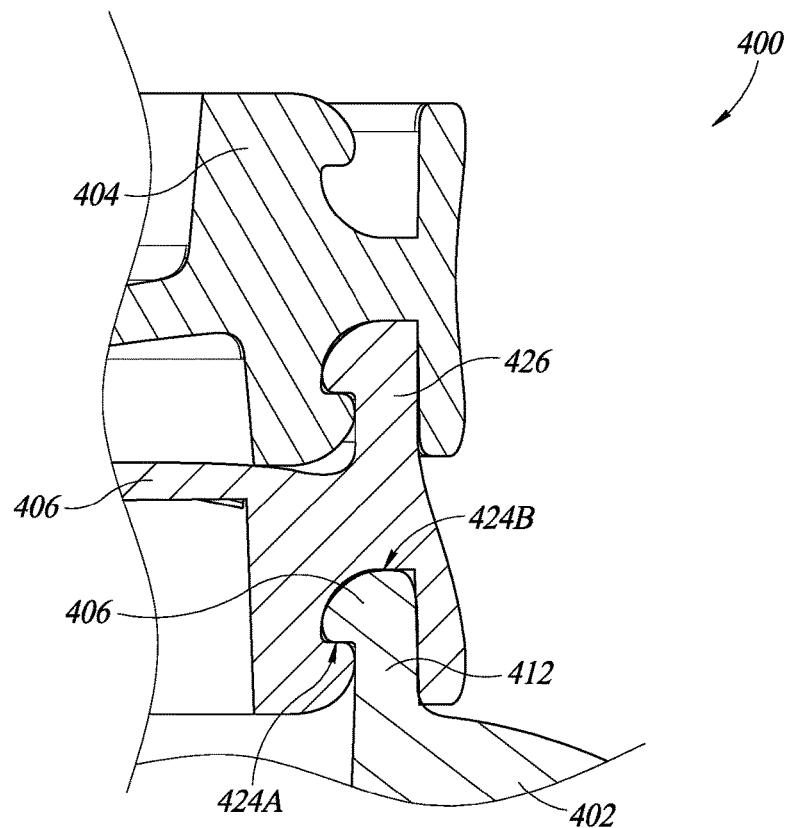
FIG. 20 is a detailed cross-sectional view of a connection between the receptacle, the first lid, and the second lid of FIG. 19.

FIG. 20 is a detailed cross-sectional view of a connection between the receptacle 402, the first lid 404, and the second lid 406. Specifically, FIG. 20 is a detail view of area B indicated with dashed lines in FIG. 19. With continuing reference to FIG. 19, the first lip 420 includes a first surface 424A and a second surface 424B opposite the first surface 424A. The first surface 424A is flat and planar and extends horizontally and perpendicularly to the first end 412 of the first receptacle 402 in some embodiments. The second surface 424B is at least partially or continuously curved or rounded in some embodiments to reduce the risk of harm from sharp edges. Thus, the first surface 424A forms a ledge or ridge to assist with coupling the first end 412 of the receptacle 402 to the first lid 404 or the second lid 406. The second lid 406 may include a similar structure 426 as the first lip 420 for coupling to the first lid 404. Further, the first and second lids 404, 406 may include channels that have a corresponding size and shape for receiving the first lip 420, as described with reference to FIG. 21. The second lip 422 shown in FIG. 19 may be a mirror image of the first lip 420. In some embodiments, the first and second lips 420, 422 have different shapes or structures that are selected to facilitate coupling to one or more lids or for frictional or physical engagement with one or more lids.

Figure 21:
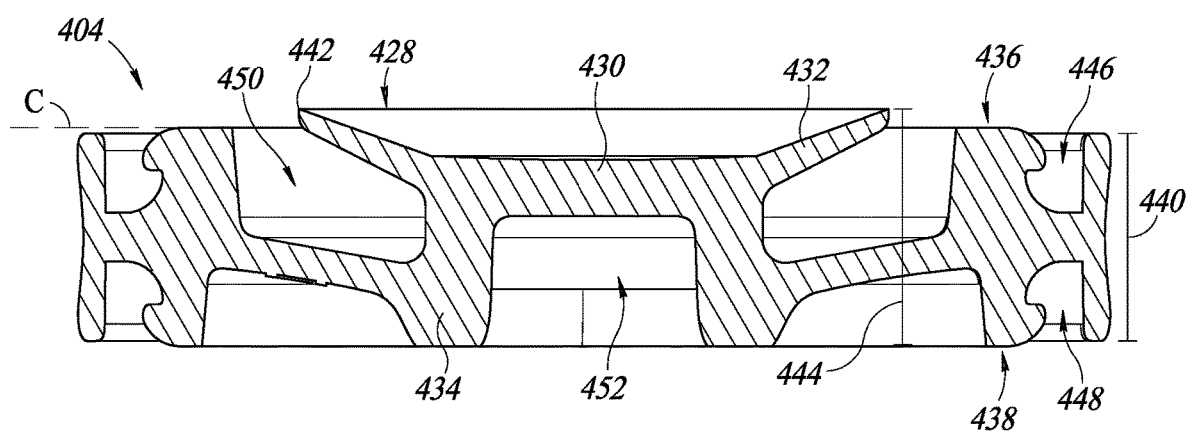
FIG. 21 is a diametric cross-sectional view of the first lid of the modular storage system of FIG. 18.

FIG. 21 is a diametric cross-sectional view of the first lid 404 of the modular storage system 400. The first lid 404 includes a suction cup 428 with a first or flat portion 430 and a second or angled portion 432 coupled to and integral with the flat portion 430 as a single, unitary component. The angled portion 432 extends radially outward and vertically away from the flat portion 430. In other words, the angled portion 432 extends continuously from the flat portion 430 at a selected transverse angle that may be between 0 and 90 degrees to horizontal in some embodiments. The suction cup 428 further includes a base 434 integral with the suction cup 428 as a single, unitary component. The base 434 provides support for the suction cup 428 and is also structured to contact the second end 414 of the body 410 of the first receptacle 402 (see FIG. 24) in order to engage the suction cup 428 to a support surface when the first lid 404 is coupled to the receptacle 402.

The first lid 404 has a first surface 436 and a second surface 438 opposite the first surface 436. In some embodiments, the first and second surfaces 436, 438 are top and bottom outermost surfaces of the first lid 404 with a height 440 of the first lid 404 extending from the first surface 436 to the second surface 438. The suction cup 428 has an outermost peripheral edge 442 and a height 444 from a bottom of the base 434 to the outermost peripheral edge 442 that is greater than the height 440 of the first lid 404. In other words, the outermost peripheral edge 442 extends beyond a horizontal plane represented by dashed line C that includes an upper surface, such as first surface 436, of the first lid 404. The height of the suction cup 428 relative to the first lid 404 assists with engaging the suction cup 428 to a support surface when the first lid 404 is coupled to the bottom of a receptacle, as explained further herein. In some embodiments, the height 440 of the first lid 404 is equal to or greater than the height 444 of the suction cup 428 and base 434.

Figure 26:
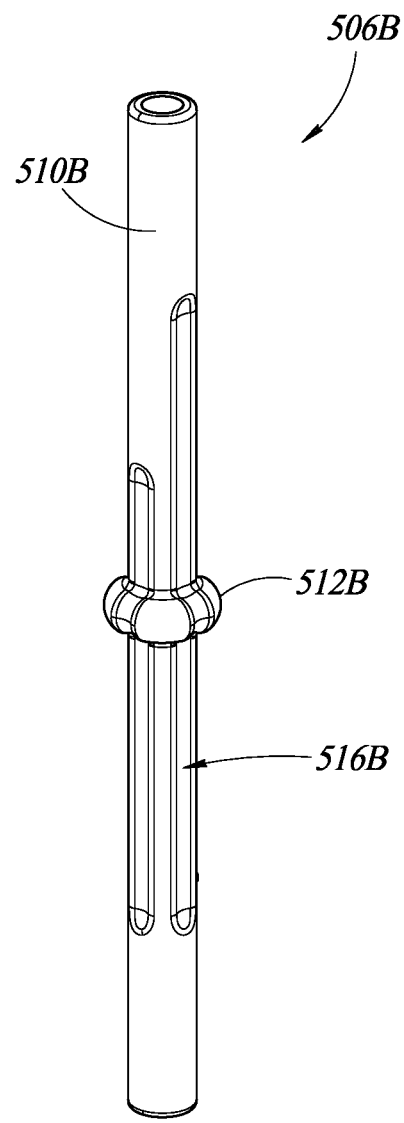
FIG. 26 is a perspective view of a straw of the modular storage system of FIG. 25.

The first lid 404 further includes a first channel 446 in the first surface 436 of the first lid 404 that is structured to receive the first lip 420 and the second lip 422 (FIG. 19) of the first lid 404 to facilitate the interchangeable coupling of the first lid 404 to the body 410 of the first receptacle 402 (FIG. 19). The first channel 446 extends around at least part of, or all of, the first lid 404 in some embodiments. The first lid 404 also includes a second channel 448 in the second surface that is aligned with the first channel and is a mirror image of the first channel 446. The second channel 448 is structured to receive the lip of an additional receptacle in a stacking arrangement, as shown in FIG. 26. A third channel 450 extends into the first surface 436 of the first lid 404 around the suction cup 428 to provide the suction cup 428 with space to expand and contract during attachment to a support surface. The third channel 450 is positioned closer to the suction cup 428 and a center of the first lid 404 than the first channel 446 and the second channel 448.

Figure 22:
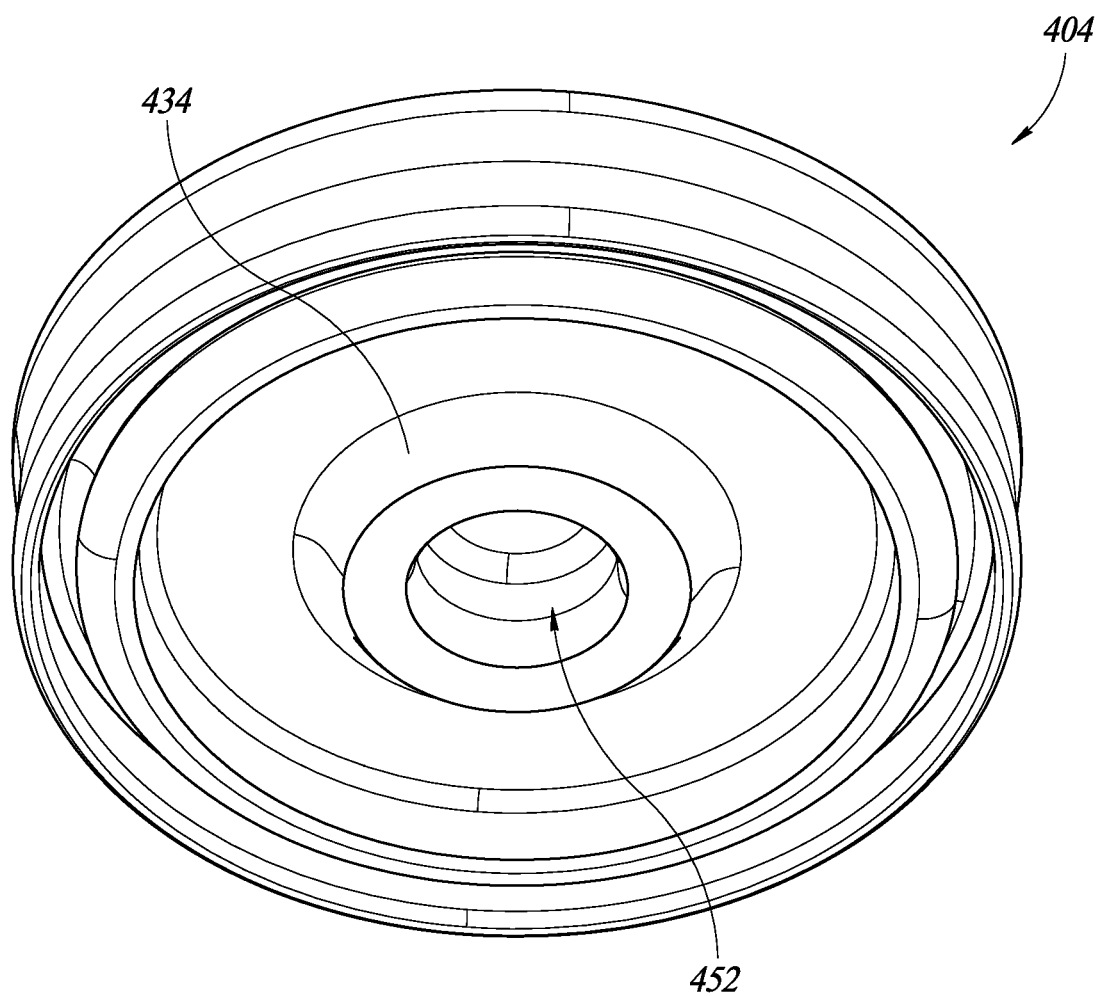
FIG. 22 is a perspective bottom view of the first lid of the modular storage system of FIG. 18.

FIG. 22 is a perspective bottom view of the first lid 404 of the modular storage system 400. In particular, FIG. 22 shows that the base 434 of the suction cup 428 includes a cavity 452, which can reduce the material cost of the first lid 404. The base 434 of the suction cup 428 (FIG. 21) also extends from the bottom of the first lid 404 to assist with engaging the suction cup 428 to a support surface through contact of the base 434 of the suction cup 428 with the bottom of a receptacle.

Figure 23:
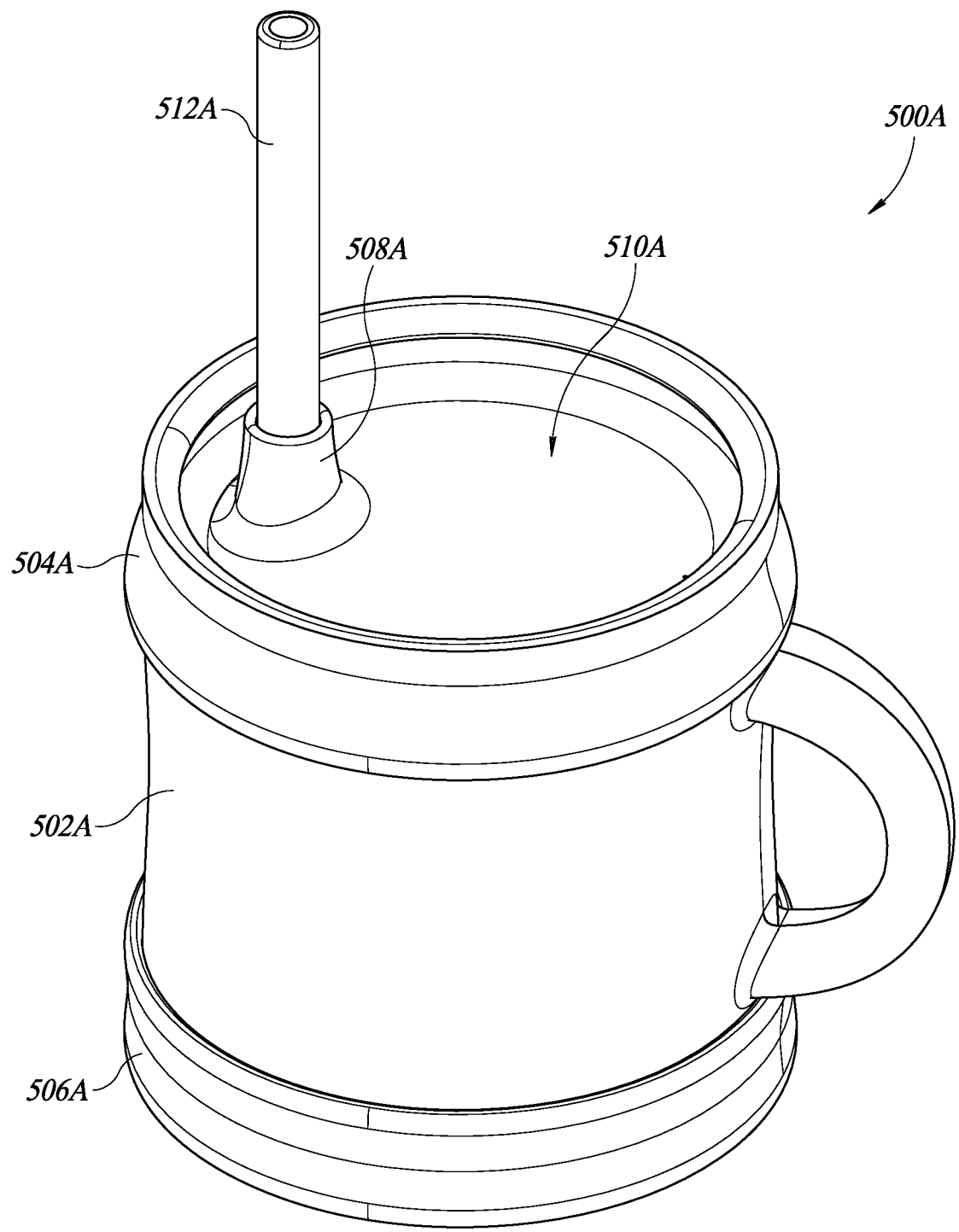
FIG. 23 is a perspective view of an embodiment of a modular storage system including a first receptacle, a first lid, and a second lid in a use configuration.

FIG. 23 is a perspective view of an embodiment of a modular storage system 500A including a receptacle 502A, a first lid 504A, and a second lid 506A. The first receptacle 502A and the second lid 506A may be identical to the receptacle 402 and the first lid 404 of the system 400 described with reference to FIGS. 18-22, in some embodiments. The first lid 504A is configured to be coupled to the receptacle 502A and includes a protrusion 508A extending from a top surface 510A of the first lid 504A. The first lid 504A is also structured to receive the second lid 506A in a stacked arrangement to seal the first lid 504A. As shown in FIG. 23, the protrusion 508A is structured to receive a straw 512A, such that the first lid 504A and receptacle 502A are operable as a "sippy cup" and the second lid 506A is operable to seal the first lid 504A to minimize or prevent liquid from escaping through the protrusion 508A, as further described herein.

Figure 24A:
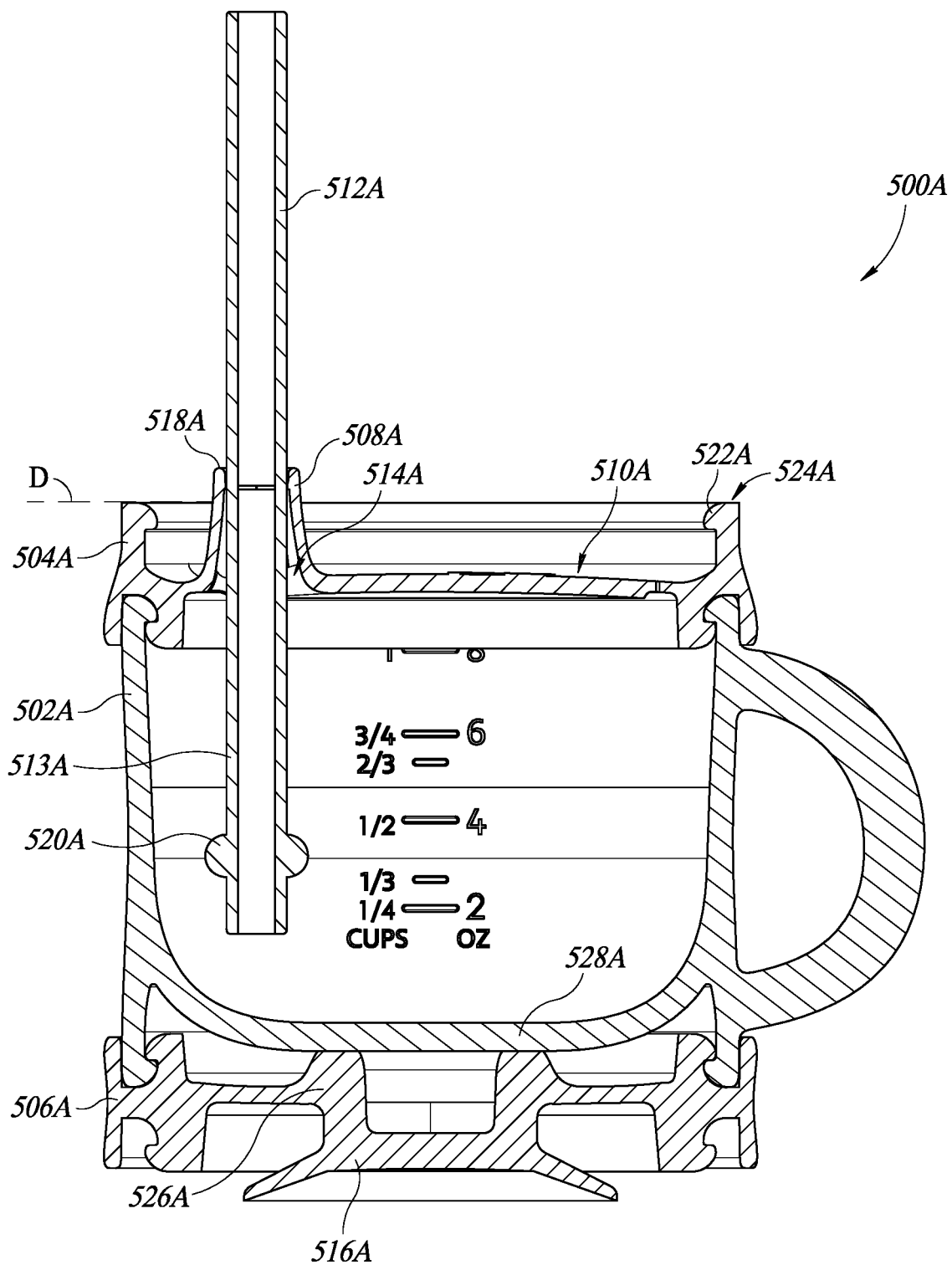
FIG. 24A is a diametric cross-sectional view of the modular storage system of FIG. 23 in the use configuration.

FIG. 24A is a diametric cross-sectional view of the modular storage system 500A showing features of the system 500A in additional detail. In particular, the protrusion 508A of the first lid 504A has an axial bore 514A through the protrusion 508A. The axial bore 514A is sized and shaped to receive the straw 512A with sidewalls of the protrusion 508A in abutting contact or frictional engagement with the straw 512A. In some embodiments, the sidewalls of the protrusion 508A form a liquid tight seal or substantially liquid tight seal with the straw 512A such that minimal, if any, liquid will escape the receptacle 502A if the system 500A tips over. In this context only, "substantially liquid tight seal" refers to a volume of liquid escaping through the protrusion 508A over a selected period of time, wherein the volume of liquid may be 16, 15, 14, 13, 12, 11, 10, 9, 8, 7, 6, 5, 4, 3, 2, 1 or fewer ounces that escape through the protrusion 508A with the straw 512A inserted over a period of time of one minute, 45 seconds, 30 seconds, 15 seconds, 10 seconds, 5 seconds, or less when the system 500A is horizontal or on its side on a support surface. However, as with system 400, the second lid 506A of the system 500A includes a suction cup 516A that is structured to be coupled to the receptacle 502A and to engage a support surface to prevent the system 500A from tipping over, which also reduces the likelihood of liquid spilling from the receptacle 502A to the support surface via the protrusion 508A and axial bore 514A.

In some embodiments, the sidewalls of the protrusion 508A are tapered along at least a portion of, or all of, the height of the protrusion 508A such that a diameter of the axial bore 514A is greater proximate the top surface 510A of the first lid 504A than a diameter of the bore 514A at an outer or outermost peripheral edge 518A of the protrusion 508A. The tapered sidewalls of the protrusion 512A can assist with engaging the straw 512A while also enabling some angular or side-to-side movement of the straw 512A relative to the receptacle 502A. Further, the straw 512A can include a protrusion 520A projecting from the straw 512A to resist or prevent the straw 512A from sliding completely through the axial bore 514A of the protrusion 508A of the first lid 504A. The protrusion 520A of the straw 512A may also be referred to herein as a ledge, flange, stopper, or ridge 520A. In some embodiments, the protrusion 520A of the straw 512A is annular and extends outward from a sidewall 513A of the straw 512A around an entirety of the circumference of the straw 512A. In one or more embodiments, the protrusion 520A extends from only a portion of the circumference of the straw and may include more than one protrusion 520A spaced about the straw 512A. In some embodiments, the protrusion 520A is located on a lower half or upper half of the straw 512A and is positioned closer to a top or bottom of the straw 512A than a center of the straw 512A.

The first lid 504A further includes a lip 522A that may be similar to lip 420 to facilitate interchangeable coupling of the second lid 506A to the first lid 504A, or other similar articles in a stacking arrangement. The lip 522A of the first lid 504A also defines an outer or outermost peripheral surface 524A of the first lid 504A. In some embodiments, the protrusion 508A of the first lid 504A extends beyond a plane indicated by dashed line D that includes the outer or outermost peripheral surface 524A of the first lid 504A to allow the user to more easily access the protrusion 508A (i.e., to more easily place their mouth on the protrusion 508A). 506A Further, the suction cup 516A of the second lid 506A includes a base 526A that contacts a bottom 528A (which may also be referred to herein as a bottom portion 528A or a portion 528A) of the receptacle 502A to engage the suction cup 516A to a support surface. In other words, the suction cup 516A and base 526A have a height that is greater than a depth of the cavity below the bottom 528A of the receptacle 502A. As such, when the second lid 506A is placed on a support surface with the suction cup 516A facing the support surface and the receptacle 502A is coupled to the second lid 506A by pressing the receptacle 502A down into the second lid 506A, the bottom 528A of the receptacle 502A presses the suction cup 516A against the support surface to attach the suction cup 516A to the support surface. Thus, in some embodiments, the suction cup 516A is structured to automatically contact and engage a support surface during coupling of the various components described herein. Alternatively, the user can couple the second lid 506A to the receptacle 502A first, and then press the assembly onto the support surface, with the bottom 528A of the receptacle 502A again contacting the second lid 506A and assisting with securing the suction cup 516A to the support surface.

Figure 24B:
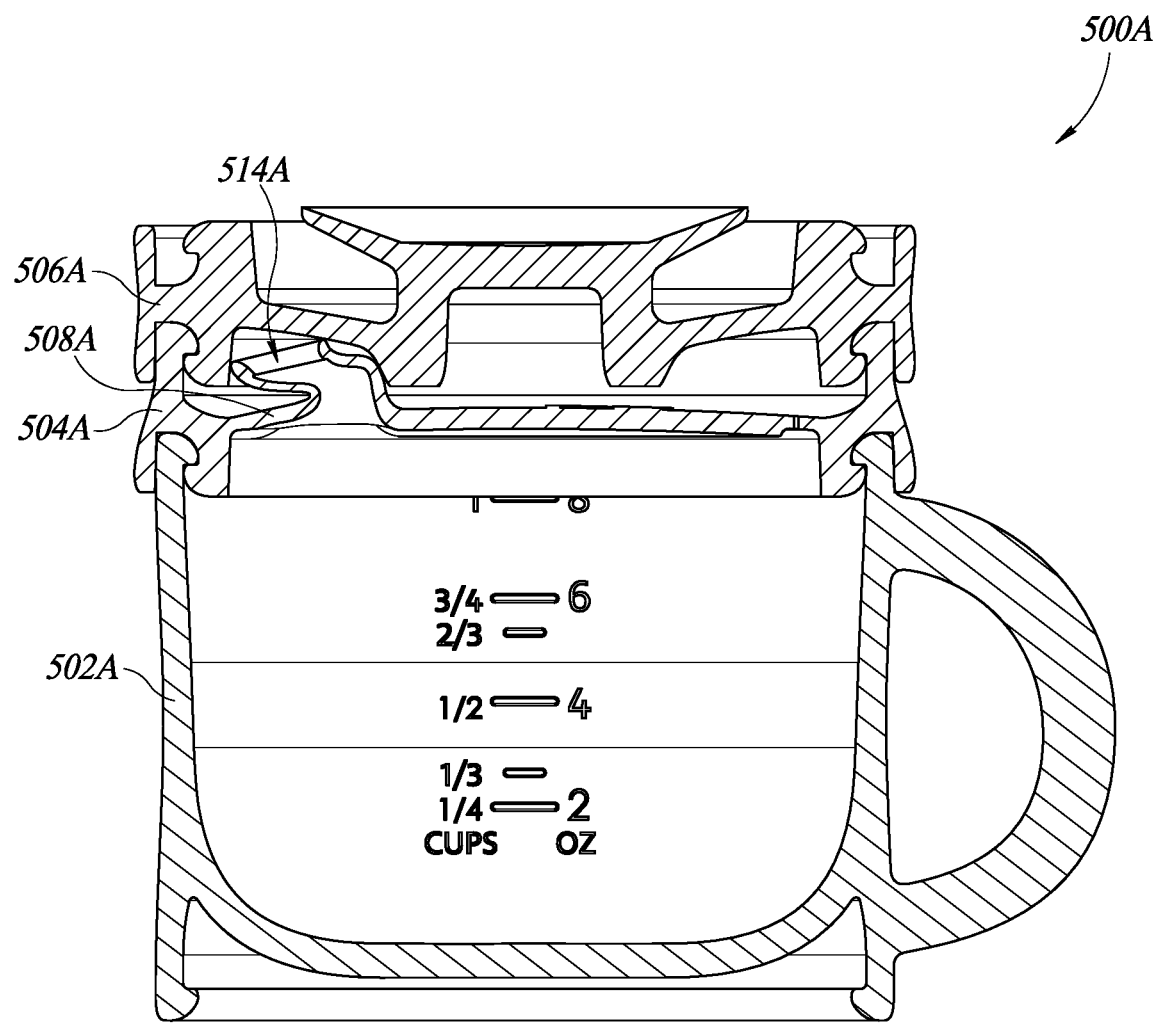
FIG. 24B is a diametric cross-sectional view of the modular storage system of FIG. 23 in a storage configuration.
Figure 25:
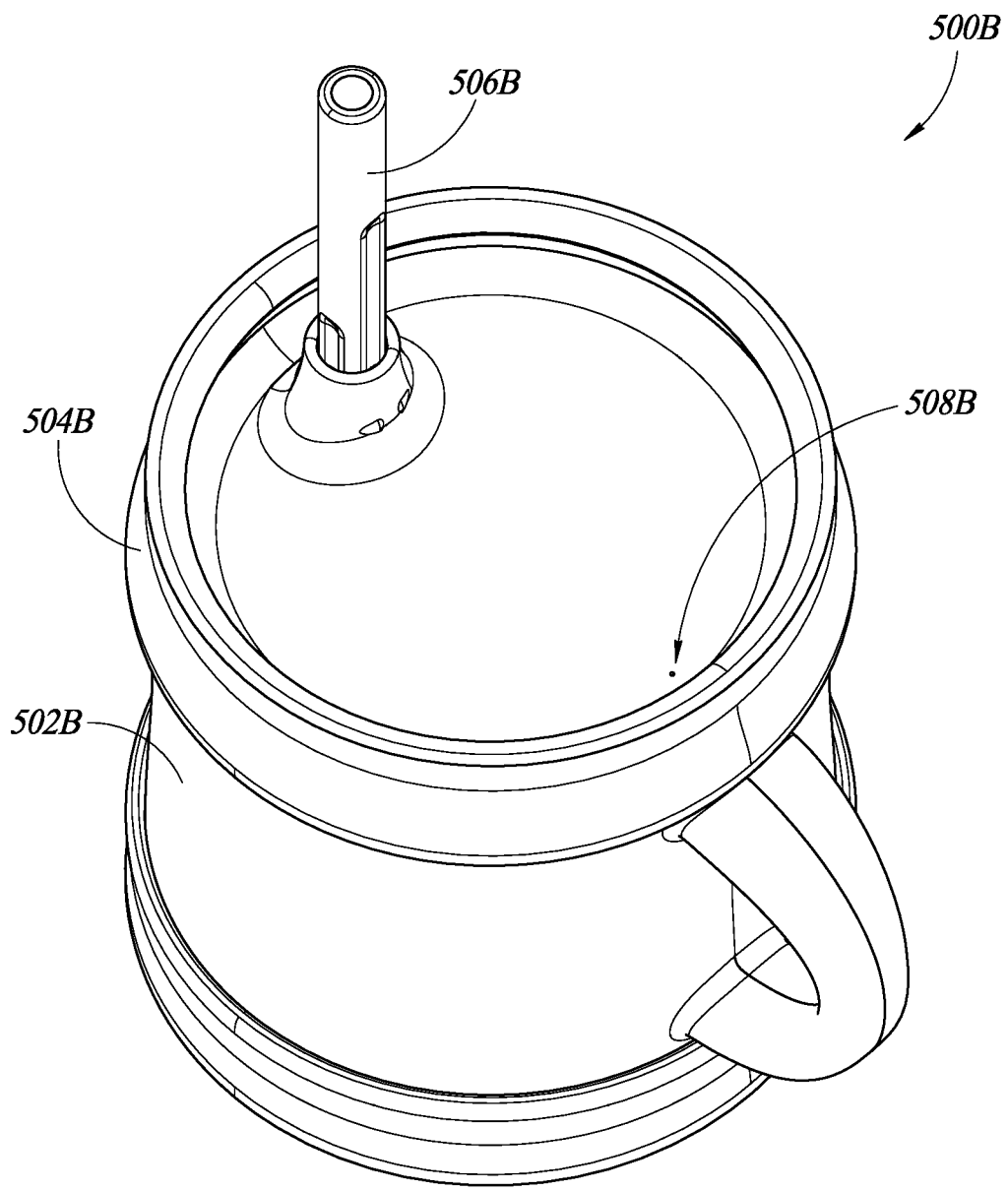
FIG. 25 is a perspective view of an embodiment of the modular storage system of FIG. 23.

FIG. 24B is a diametric cross-sectional view of the modular storage system of FIG. 23 in a storage configuration. In FIG. 24B, the second lid 506A is coupled to the first lid 504A with the protrusion 508A in abutting contact with the second lid 506A0. The straw 512A is removed prior to coupling the second lid 506A to the first lid 504A, and can be reinserted through a bottom of the first lid 504A in the use configuration shown in FIG. 23 and FIG. 24A. In some embodiments, the second lid 506A includes an elastic or flexible material, such as food grade silicone, with a wall thickness that is less than a wall thickness of the second lid 506A and the protrusion 508A has a height greater than a depth of a cavity between the first lid 504A and the second lid 506A. Thus, when the second lid 506A is coupled to the first lid 504A, the second lid 506A presses down on the first lid 504A and deforms the protrusion 508A as shown in FIG. 24B. Alternatively, the second lid 506A may deform the protrusion 508A by expanding a diameter of the protrusion 508A, in which case the second lid 506A is in abutting contact with the protrusion 508A and further seals the axial bore 514A. In some embodiments, the protrusion 508A may have a greater wall thickness than the second lid 506A and will deform a web of the second lid 506A.

FIGS. 25-31 are various views of an additional embodiment of the modular storage system 500B. The modular system 500B is the same as system 500A, except as otherwise described below. Beginning with FIG. 25, the system 500B includes a receptacle 502B and a first lid 504B coupled to the receptacle 502B. The first lid 504B is configured to receive a straw 506B and includes an air hole 508B through the lid 504B to prevent formation of a vacuum in the receptacle 502B during use. FIG. 26 is a perspective view of the straw 506B which includes a sidewall 510B and a stopper 512B extending from the sidewall 510B of the straw 506B. In the illustrated embodiment, the stopper 512B is positioned proximate a center of the straw 506B relative to its height in order to prevent a user from pulling the straw 506B out of the first lid 504B (see FIG. 28). The position of the stopper 512B relative to the straw 506B can be selected according to design factors. Further, the straw 506B includes at least one groove 514B extending into the sidewall 510B of the straw 506B. The at least one groove 514B is a channel extending in a longitudinal direction of the straw 506B and allows for air flow around the straw 506B when the straw 506B is inserted into the first lid 504B. As shown in FIG. 26, there are a plurality of grooves 516B spaced equidistant from each other about a diameter of the straw 506B with the grooves 516B generally arranged in a vertical direction in the orientation shown in FIG. 26. However, the characteristics of the grooves 516B can also be selected, such that the spacing, size, number, and orientation of the grooves 516B may be different in some embodiments. The at least one groove 516B also extends across the stopper 512B such that the stopper 512B does not restrict airflow during use.

Figure 27:
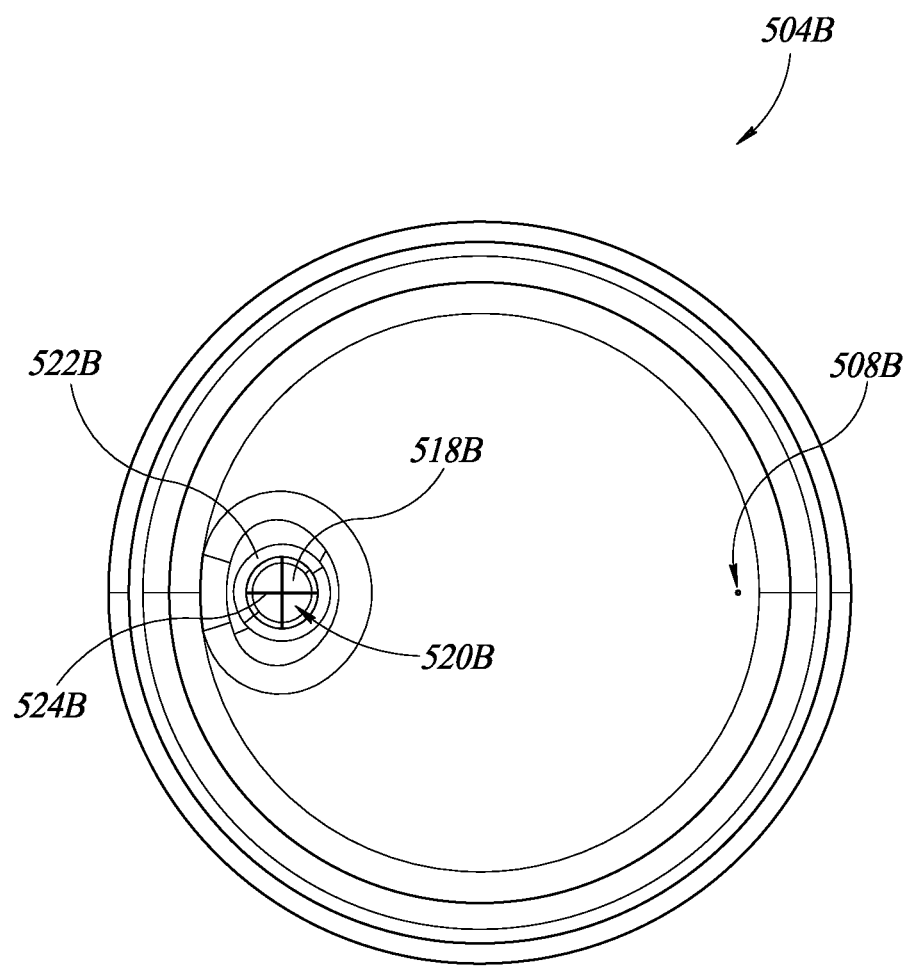
FIG. 27 is a top plan view of a first lid of the modular storage system of FIG. 25.

FIG. 27 is a top plan view of the first lid 504B that illustrates that the lid 504B includes a membrane 518B extending across an opening 520B of a protrusion 522B extending from the first lid 504B and structured to receive the straw 506B. The membrane 518B may be a layer of elastic and flexible material, such as food grade silicone with a thickness and position relative to the protrusion 522B that is selected according to design factors. The membrane 518B prevents or restricts liquid from spilling out of the receptacle 502B if the receptacle 502B is tipped or knocked over. Further, the membrane 518B includes at least one slit 524B such that liquid can be dispensed through the opening 520B when pressure is applied to the membrane 518B, such as negative pressuring from sucking on the protrusion 522B during normal use. In the illustrated embodiment, the at least one slit 524B includes two slits 524B that are perpendicular to each other in an "X" shape although other numbers of slits 524B and arrangements of the slits 524B are contemplated herein, such as a single slit 524B across the membrane 518B in one non-limiting example. Thus, the first lid 504B can be used without the straw 506B as a "sippy" lid with the membrane 518B preventing liquid from spilling or slowing a rate of liquid spills and the slit 524B allowing for liquid to pass through opening 520B under pressure during use.

Figure 28:
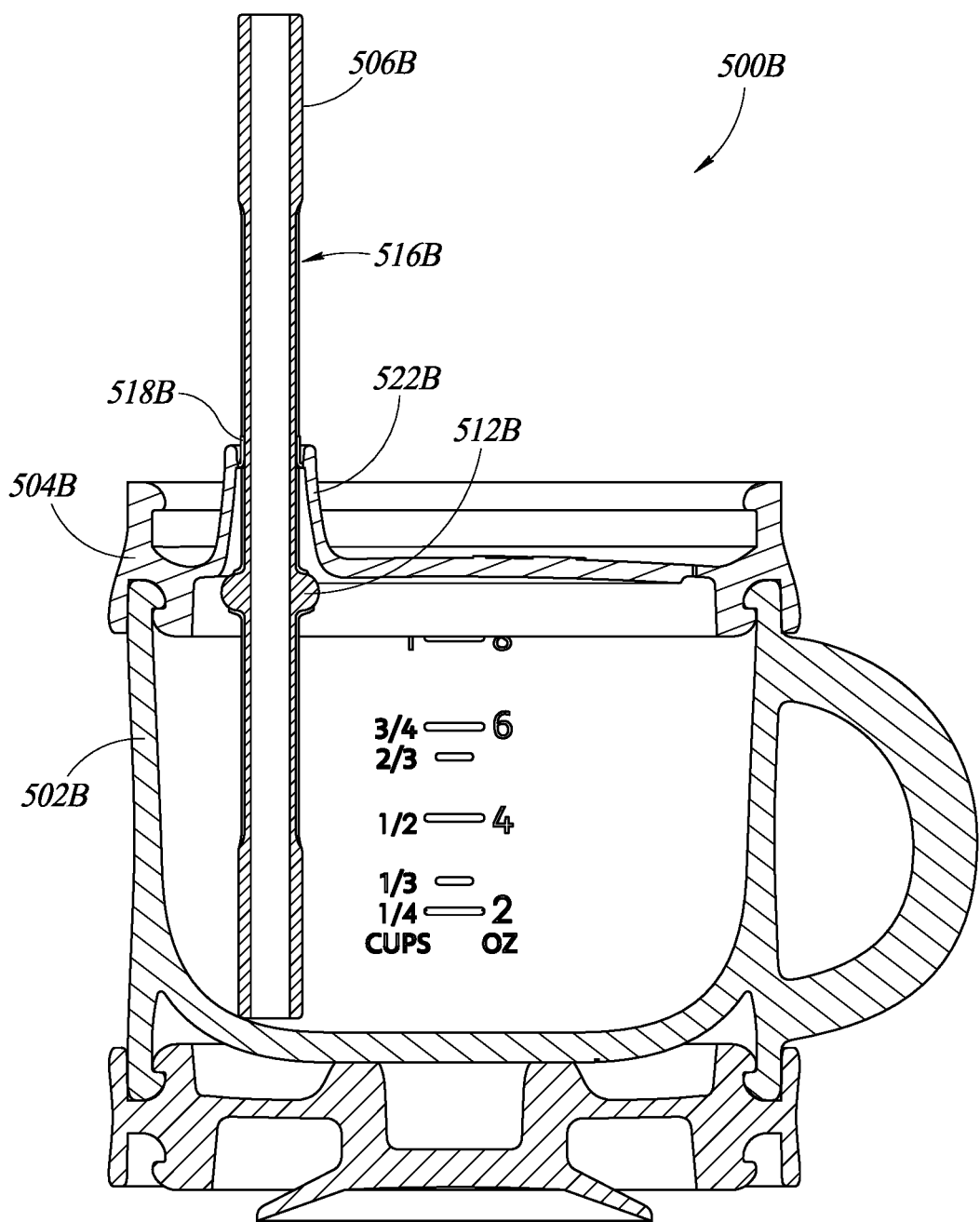
FIG. 28 is a diametric cross-sectional view of the modular storage system of FIG. 25.

FIG. 28 is a diametric cross-sectional view of the system 500B. To assembly the system 500B and utilize the straw 506B, the user removes the first lid 504B inserts the straw 506B through a bottom of the protrusion 522B and through the opening 520B (FIG. 27). Then, the user couples the first lid 504B with the straw 506B to the receptacle 502B. As shown in FIG. 28, the straw 506B passes through the membrane 518B and via the slits 524B (FIG. 27) and deflects the membrane 518B toward the protrusion 522B. The stopper 512B is positioned proximate to, but below a base or bottom of the protrusion 522B to prevent the stopper 512B from restricting airflow via the grooves 516B and to also limit a range of motion of the straw 506B. In other words, the stopper 512B is proximate to, but does not contact (i.e., is spaced from) the protrusion 522B to prevent a user from pulling up on the straw 506B while also allowing air to flow through the protrusion 522B via the grooves 516B. The straw 506B can be removed by reversing the steps above and the first lid 504B can be used as a sippy cup lid, as described above.

Figure 29:
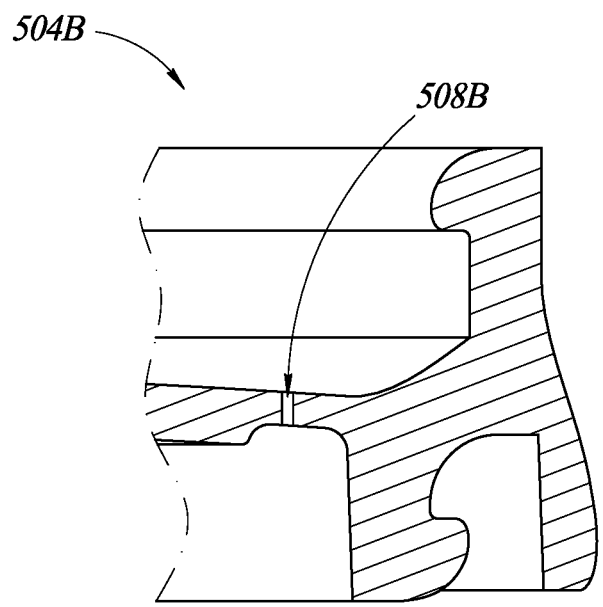
FIG. 29 is a detail view of a portion of the first lid of FIG. 27.

FIG. 29 is a detail view of a portion of the first lid 504B showing the air hole 508B in additional detail. Specifically, the air hole 508B extends completely through a web of the first lid 504B from a first surface of the web to a second surface of the web to allow air to pass through the air hole 508B and prevent a vacuum from forming in the receptacle 502B during use. The air hole 508B has a small diameter in some embodiments to reduce the amount of liquid that passes through the air hole 508B if the system 500B is knocked or tipped over. Further, the air hole 508B is positioned proximate an outer peripheral edge of the first lid 504B in some embodiments, although the size and the position of the air hole 508B can be selected to be different in some embodiments according to design factors.

Figure 30:
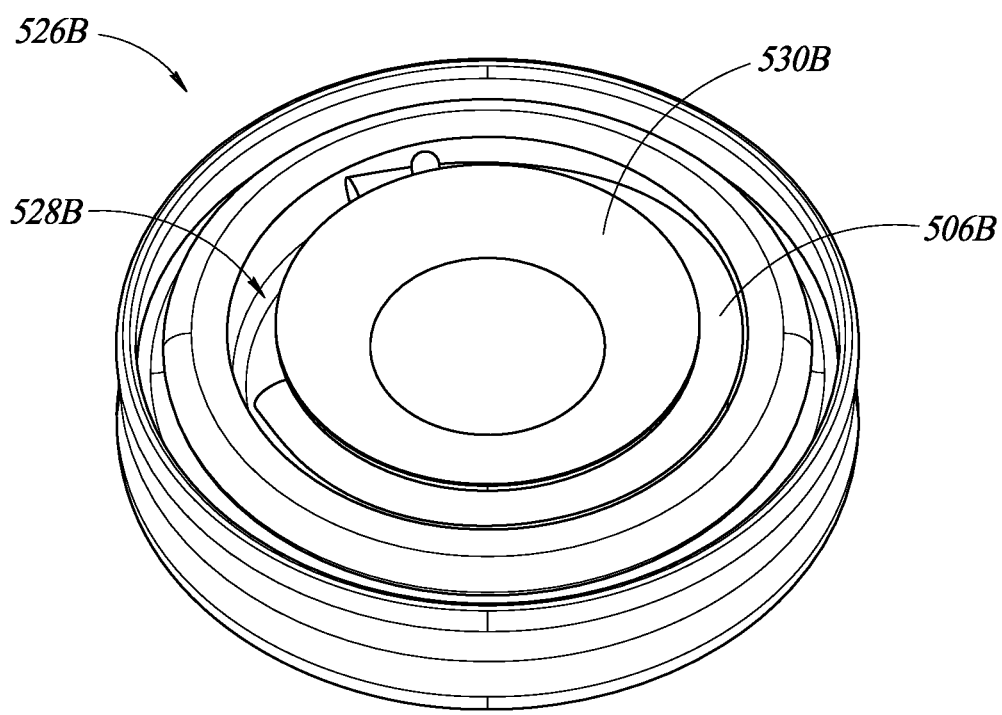
FIG. 30 is a top perspective view of a second lid of the modular storage system of FIG. 25.

FIG. 30 is a top perspective view of a second lid 526B that is structured to be coupled to the receptacle 502B and the first lid 504B in a stacking arrangement, as described herein. The second lid 526B has a channel 528B around a suction cup 530B. In some embodiments, the straw 506B is formed from a flexible and elastic material, such as food grade silicone, and has a size and a shape to be received in the channel 528B. In other words, the straw 506B can be bent and coupled to the second lid 526B with the straw 506B received within the channel 528B for storage when the straw 506B is not in use. Further, the second lid 526B can be coupled to the first lid 504B (see FIG. 24B) with the second lid 526B pressing down on the protrusion 522B (FIG. 28) in a storage configuration. In the storage configuration, the second lid 526B deforms the protrusion 522B and may cause the membrane 518B to open slightly. However, the coupling between the first lid 504B and the second lid 526B acts as a second seal (between the lids 504B, 526B or between the second lid 526B and the top of the protrusion 522B, or both) that prevents liquid from spilling. Still further, the coupling of the second lid 526B to the first lid 504B prevents liquid from escaping that may pass through air hole 508B. Thus, the second lid 526B seals the first lid 504B in the storage configuration with the second lid 526B also receiving and storing the straw 506B in the channel 528B.

Figure 31:
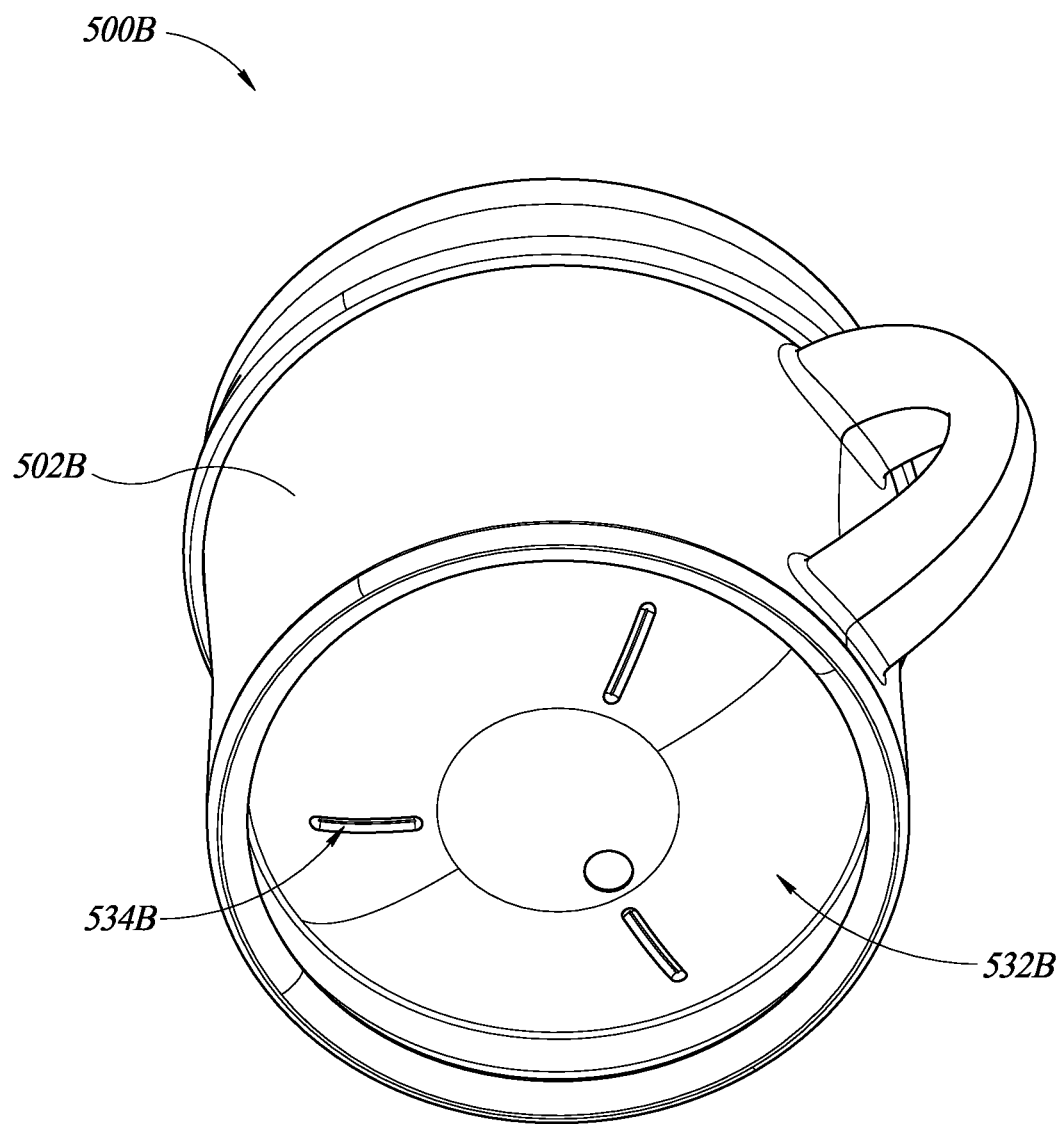
FIG. 31 is a bottom perspective view of the modular storage system of FIG. 25.

FIG. 31 is a bottom perspective view of the modular storage system 500B. In particular, FIG. 31 illustrates a bottom surface 532B of the receptacle 502B wherein the bottom surface 532B includes at least one channel 534B extending into the bottom surface 532B. The at least one channel 534B prevents the suction cups described herein from sticking to the bottom of the receptacle 502B in the stacked arrangement (see FIG. 35). The number, size, and arrangement of the at least one channel 534B can be selected. In the illustrated embodiment, there are three channels 534B spaced equidistant about a center of the bottom surface 532B in order to provide a balanced resistance to the suction force from the suction cup. Further, while FIG. 31 includes channels 534B, other structures are contemplated herein for preventing the suction cup from coupling to the bottom surface 532B, such as protrusions, ledges, ridges, apertures, cavities, and other like structures. Thus, the channels 534B increase the ease of use of the system 500B and allow the modular storage system 500B to be separated more easily from other storage systems while keeping the lids, such as second lid 526B, coupled to the receptacles 502B.

Figure 32:
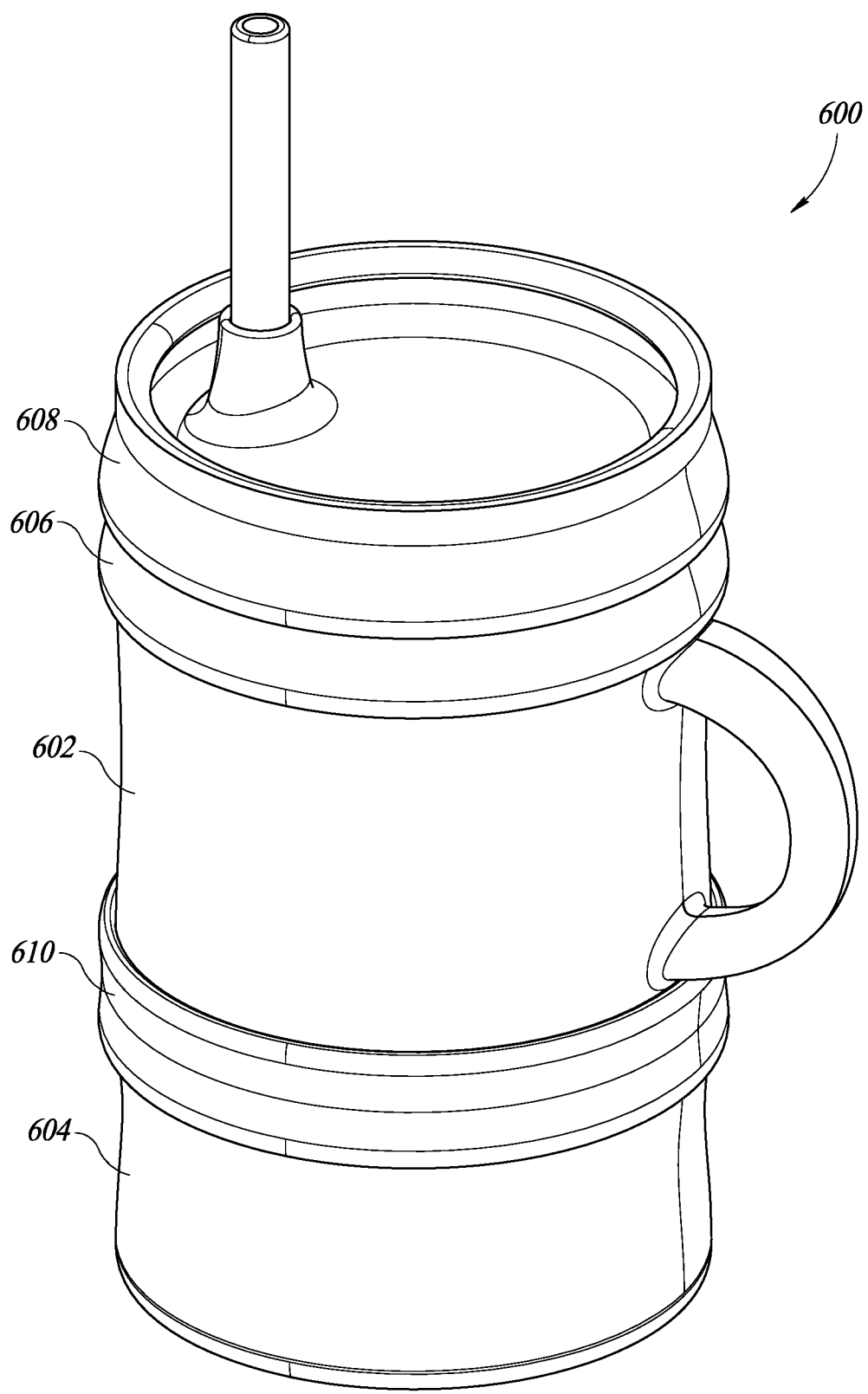
FIG. 32 is a perspective view of an embodiment of a modular storage system including a first receptacle, a second receptacle, a first lid, a second lid, and a third lid coupled together in a stacked arrangement.
Figure 33:
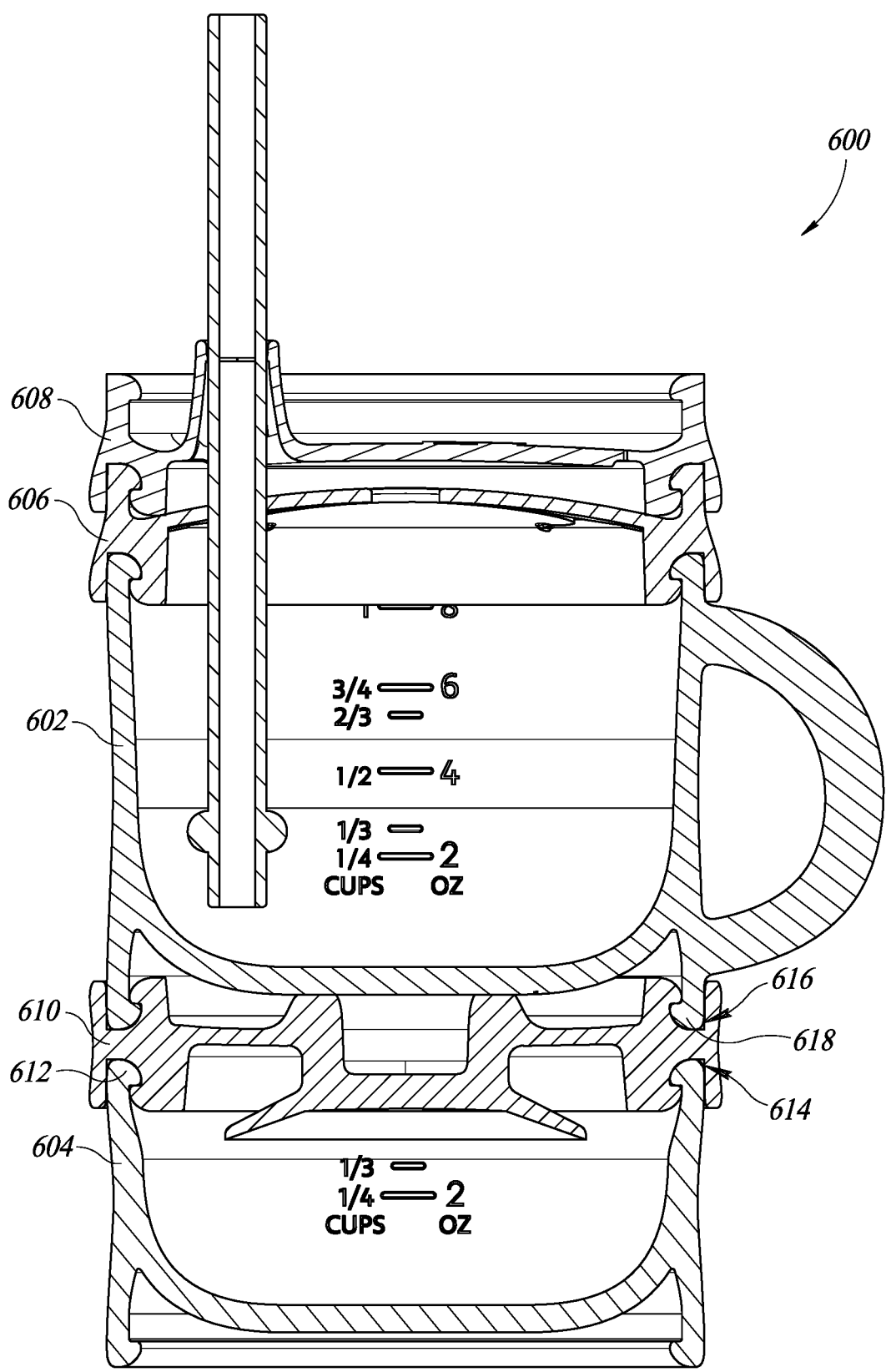
FIG. 33 is a diametric cross-sectional view of the modular storage system of FIG. 32.

FIG. 32 is a perspective view of an embodiment of a modular storage system 600 including a first receptacle 602, a second receptacle 604, a first lid 606, a second lid 608, and a third lid 610 coupled together in a space-saving stacked arrangement. FIG. 33 is a diametric cross-sectional view of the modular storage system 600 shown in FIG. 32. With reference to FIG. 32 and FIG. 33, the first receptacle 602 may be similar to receptacle 402 (FIG. 19), the first lid 606 may be similar to lid 406 (FIG. 18), the second lid 608 may be similar to lid 504A (FIG. 24A), and the third lid 610 may be similar to lid 404 (FIG. 21). Thus, FIG. 32 and FIG. 33 are provided to show the interchangeable coupling of the various components described herein as well as features of the second receptacle 604.

As best shown in FIG. 33, the second receptacle 604 has a lip 612 that is structured to be received in a first channel 614 of the third lid 610. Put differently, the first channel 614 of the third lid 610 has a size and a shape to frictionally engage the lip 612 of the second receptacle 604. The third lid 610 also has a second channel 616 that is a mirror image of the first channel 614 and is structured to receive a lip 618 of the first receptacle 602. Further, FIG. 32 and FIG. 33 illustrate that the first lid 606, which may include one or more slits, can be stacked with other lids described herein, such as the second lid 608 or the third lid 610. In some embodiments, the second receptacle 604 can be the same as, or different than, the first receptacle 602. In FIG. 33, the second receptacle 604 may be a bowl without a handle and having a smaller volume than the first receptacle 602.

Figure 34:
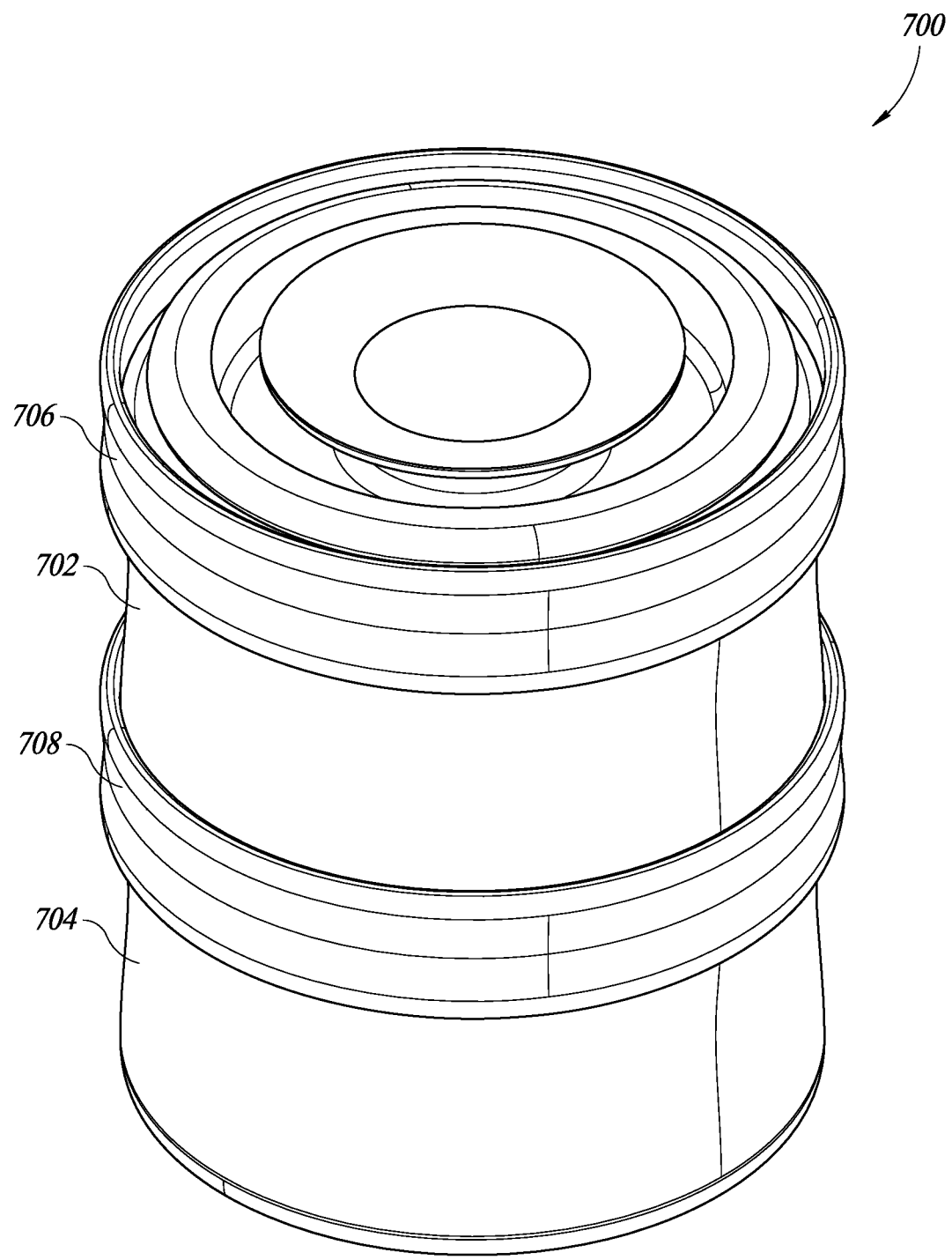
FIG. 34 is a perspective view of an embodiment of a modular storage system including a first receptacle, a second receptacle, a first lid, and a second lid coupled together in a stacked arrangement.
Figure 35:
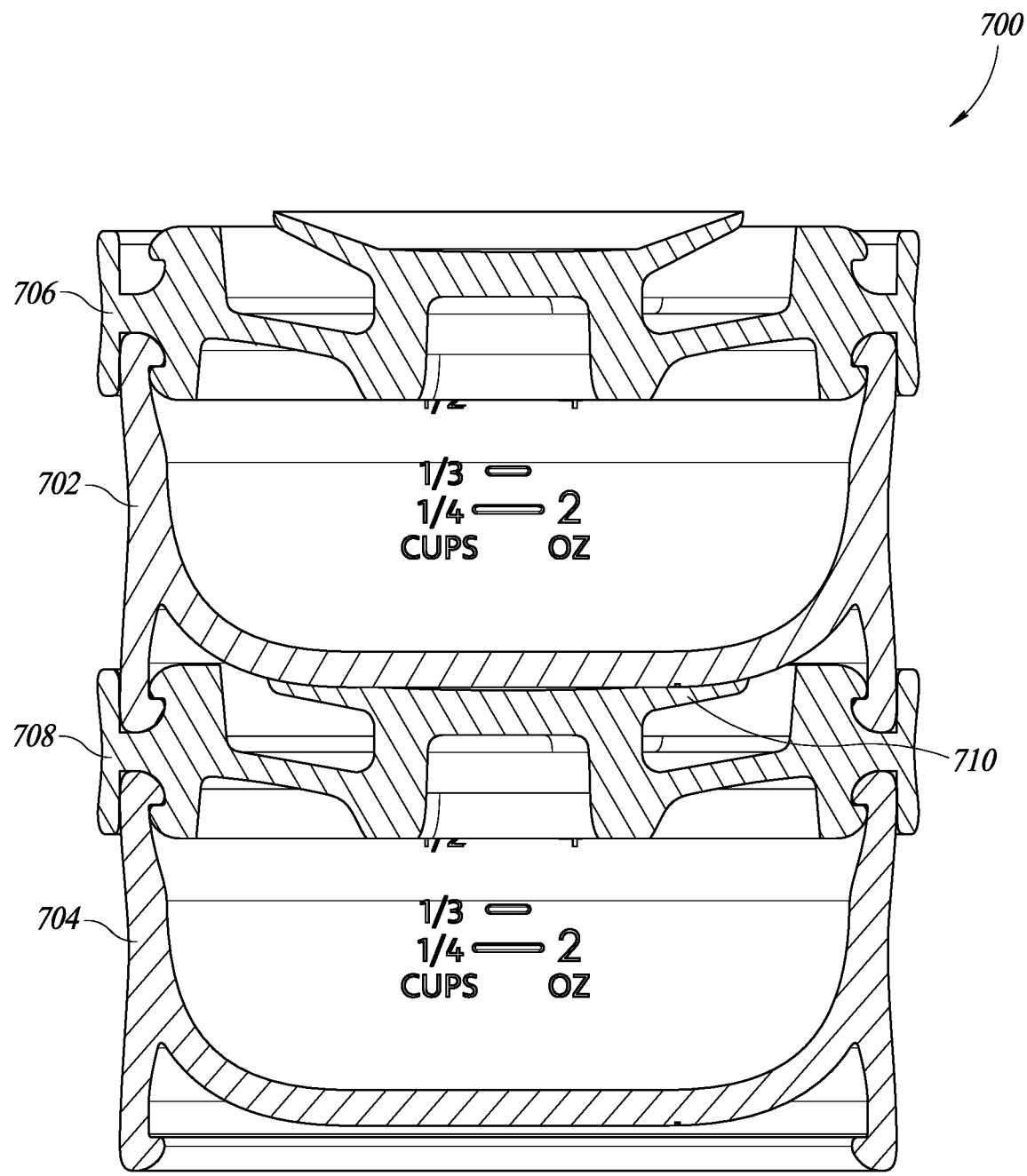
FIG. 35 is a diametric cross-sectional view of the modular storage system of FIG. 34.

FIG. 34 is a perspective view of an embodiment of a modular storage system 700 including a first receptacle 702, a second receptacle 704, a first lid 706, and a second lid 708 coupled together in a stacked arrangement. FIG. 35 is a diametric cross-sectional view of the modular storage system 700 shown in FIG. 34. In particular, FIG. 34 and FIG. 35 illustrate an additional arrangement of the lids 706, 708 in the stacked arrangement relative to other embodiments described herein. As shown best in FIG. 28, the second lid 708 can be arranged in the stacked arrangement with a suction cup 710 of the second lid 708 facing the first receptacle 702. Thus, the suction cup 710 may secure, at least partially, to the first receptacle 702 to provide a stronger coupling between the components of the system 700 in the stacked arrangement. Further, each of the receptacles 702, 704 shown in FIG. 34 and FIG. 35 are bowls. As such, the system 700 can include any selected number or type of bowls, cups, or lids described herein coupled to each other in a stacked arrangement and in a selected orientation due to the modular nature of the components.

Figure 36:
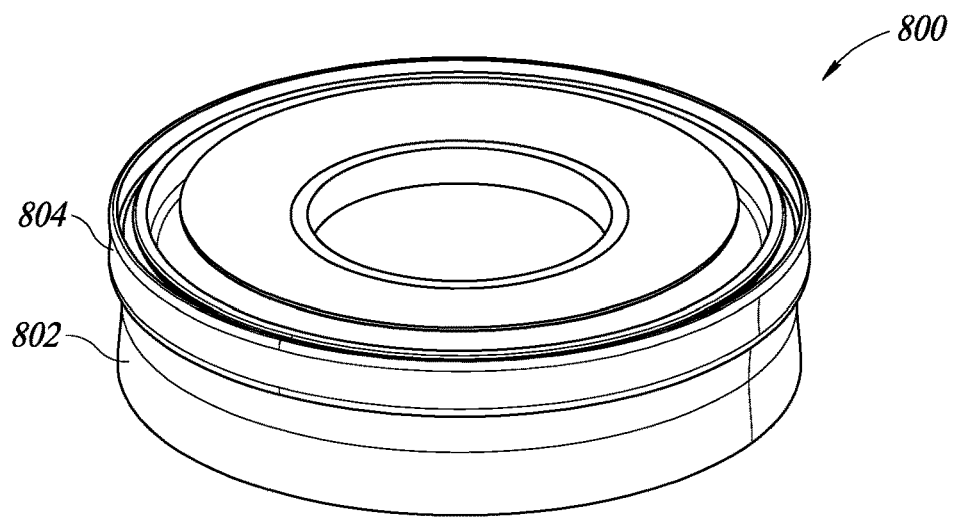
FIG. 36 is a perspective view of an embodiment of a modular storage system including a first receptacle and a first lid coupled to the first receptacle.

FIG. 36 is a perspective view of an embodiment of a modular storage system 800 including a first receptacle 802 and a first lid 804 coupled to the first receptacle 802. In the storage system 800, the first receptacle 802 may be a plate and while the first lid 804 may share some similar aspects with the other lids described herein, the size and shape of the first lid 804 corresponds to the size and shape of the plate. As such, the first lid 804 may be larger than the lids of the other storage systems described herein, in one or more embodiments.

Figure 37:
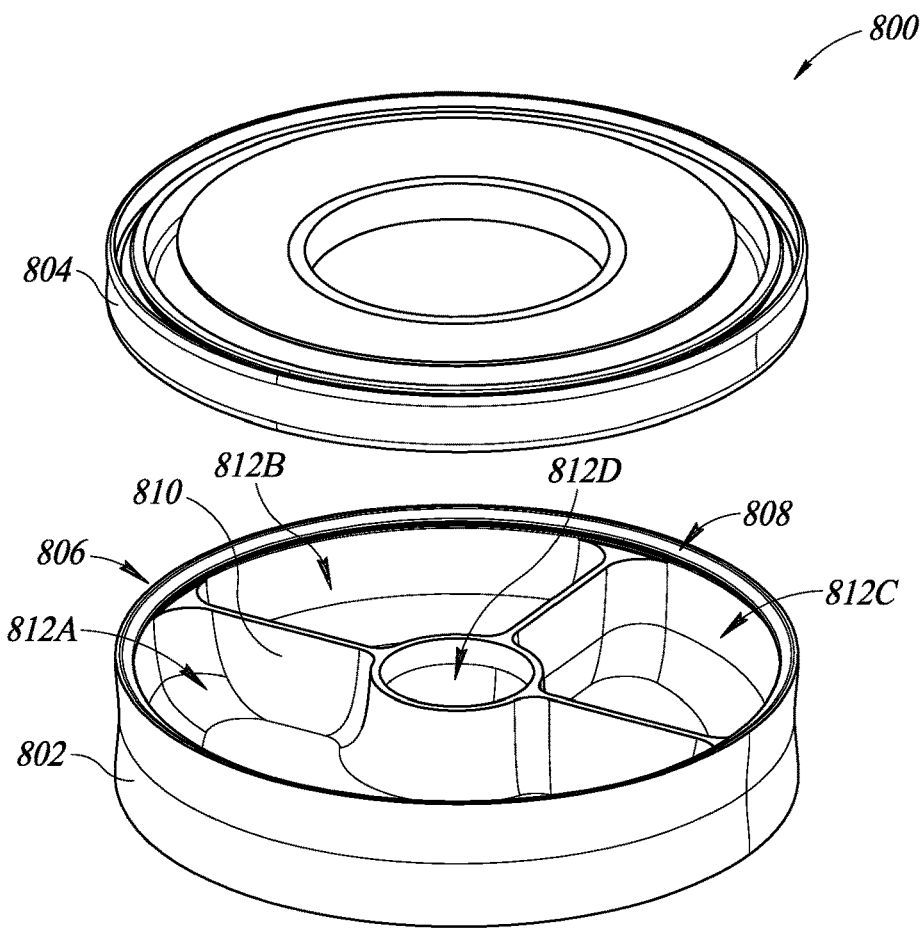
FIG. 37 is a perspective exploded view of the modular storage system of FIG. 36.
Figure 38:
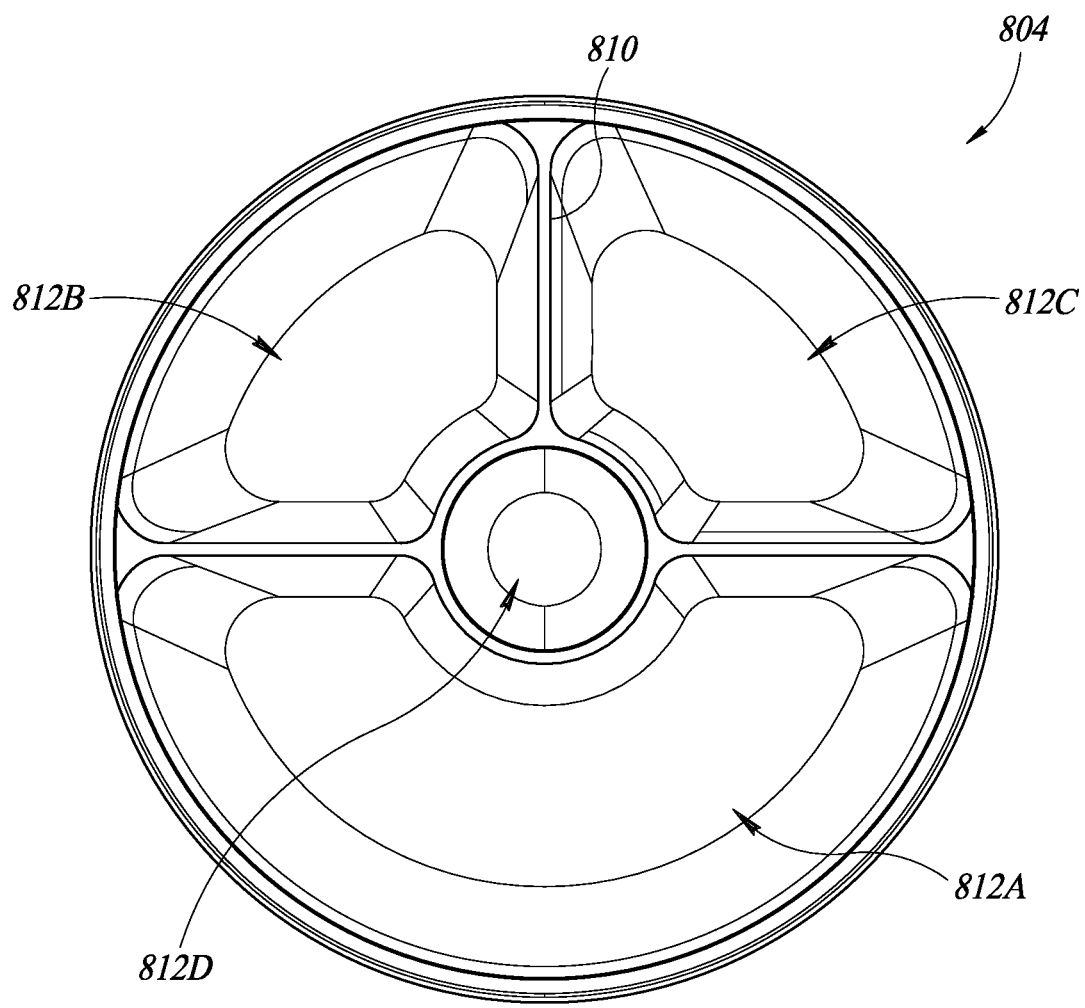
FIG. 38 is a top plan view of the first receptacle of FIG. 36.

FIG. 37 is a perspective exploded view of the modular storage system 800 and FIG. 38 is a top plan view of the first receptacle 802. With reference to FIG. 37 and FIG. 38, the first receptacle 802 includes a first surface 806 and a first opening 808 in the first surface 806. The first receptacle 802 includes a divider 810 (which may also be referred to herein as a sidewall or a plurality of sidewalls 810) that separates an interior of the first receptacle 802 and the first opening 808 into a plurality of cavities 812A, 812B, 812C, 812D each having a selected volume. In the illustrated implementation, there are four cavities with a first cavity 812A having the largest volume, the second and third cavities 812B, 812C having equal volumes smaller than the first cavity, and the fourth cavity 812D having the smallest volume. The fourth cavity 812D is arranged centrally relative to the first receptacle 802 and the first, second, and third cavities 812A, 812B, 812C are positioned around the fourth cavity 812D with the first cavity 812A on an opposite side of the receptacle 802 from the second and third cavities 812B, 812C.

In some embodiments, the first cavity 812A has a volume of eight ounces, each of the second and third cavities 812B, 812C has a volume of four ounces, and the fourth cavity 812D has a volume of one ounce, although the same is not necessarily required as the cavities 812A, 812B, 812C, 812D can be selected to have any volume, number, and arrangement. As such, the different cavities 812A, 812B, 812C, 812D can be used to organize and store different food materials in different quantities. Further, FIG. 37 and FIG. 38 illustrate that the divider 810 has angled, sloped, curved, rounded, or tapered sidewalls along its height. In other words, the divider 810 is angled, sloped, curved, rounded, or tapered along at least a first portion of the divider 810 from a bottom surface of each cavity 812A, 812B, 812C, 812D to an outer or outermost peripheral edge or surface of the divider 810 that is connected to and integral with a second vertical portion. The shape of the divider 810 can assist young children with grasping food items in the cavities 812A, 812B, 812C, 812D.

Figure 39A:
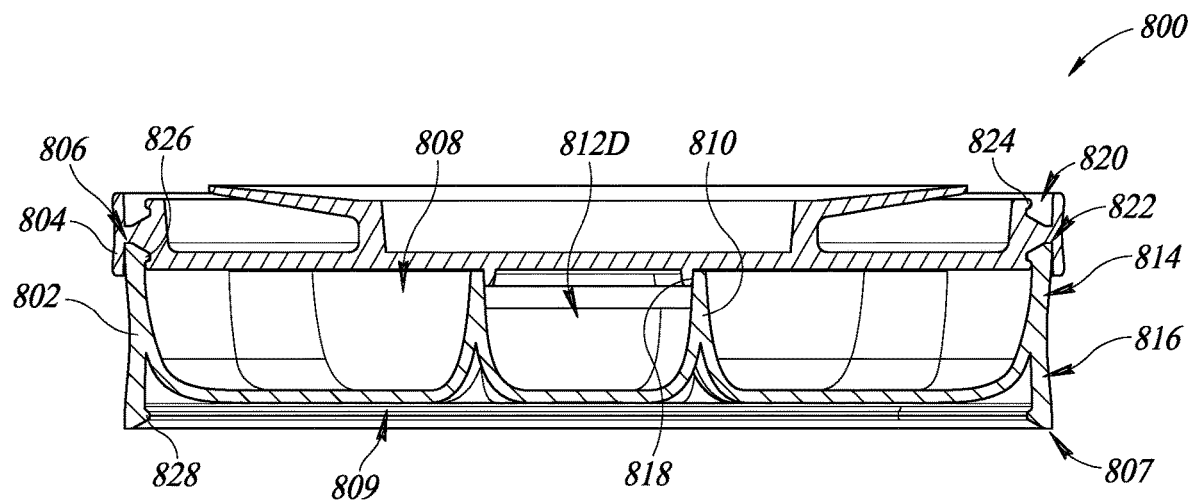
FIG. 39A is a diametric cross-sectional view of the modular storage system of FIG. 36 with the first lid coupled to a first portion of the first receptacle.
Figure 39B:
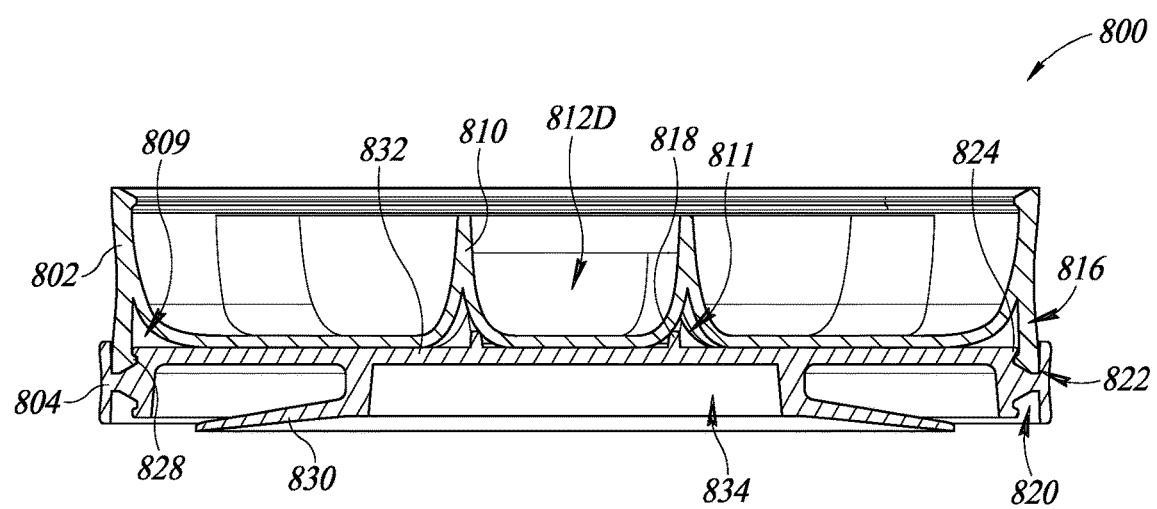
FIG. 39B is a diametric cross-sectional view of the modular storage system of FIG. 36 with the first lid coupled to a second portion of the first receptacle.

FIG. 39A is a diametric cross-sectional view of the modular storage system 800 with the first lid 804 in a storage configuration and FIG. 39B is a diametric cross-sectional view of the system 800 with the first lid 804 in a use configuration and secured to a support surface.

Beginning with FIG. 39A, the first receptacle 802 has a first portion 814 and a second portion 816 wherein the first portion 814 may be an upper portion and the second portion 816 may be a lower portion. As shown in FIG. 39A, the first lid 804 is coupled to the first portion 814 of the receptacle 802 in the storage configuration. In some embodiments, the first lid 804 includes a lip or ridge 818 that extends from a bottom surface of the first lid 804 in frictional engagement with the divider 810 around the fourth cavity 812D to seal the fourth cavity 812D and minimize or prevent food or liquid from escaping the fourth cavity 812D during storage or transport. The lip 818 may be annular and extend around an entirety of the fourth cavity 812D to provide a liquid tight seal between the first lid 804 and the fourth cavity 812D in some embodiments. The receptacle 802 further includes a second surface 807 opposite to the first surface 806 and a second opening 809 in the second portion 816 opposite the first opening 808.

The first lid 804 also includes opposing channels 820, 822 wherein each channel has a lip 824 (which may also be referred to herein as a flange, ridge, or protrusion 824) extending into the respective channel 820, 822 to engage a correspondingly shaped lip 826 of the first receptacle 802 to form a seal, which may be a liquid tight seal, between the first lid 804 and the first, second, and third cavities 812A, 812B, 812C (FIG. 38). FIG. 39A also shows additional detail of the first opening 808 in the first surface 806 of the receptacle 802 and in particular, that the first lid 804 covers the first opening 808 in the storage configuration in FIG. 39A to selectively provide access to the first opening 808.

For example, in FIG. 39B, the first lid 804 is removed to provide access to the first opening 808 and is inverted and coupled to the second portion 816 of the first receptacle 802 in a use configuration. In particular, the channel 822 and lip 824 of the first lid 804 receive the lip 828 of second portion 816 of the receptacle 802 in a frictional engagement to secure the first lid 804 to the second portion 816 of the receptacle 802. In the use configuration, the first lid 804 is coupled to the second surface 807 of the receptacle 802 and restricts access to the second opening 809. In some embodiments, at least a portion of the first lid 804 is received in the second opening 809 in the use configuration. Further, the lip 818 of the first lid 804 is received in a cavity 811 in the divider 810 that is connected to the second opening 809 and extends around a bottom of the fourth cavity 812D.

The first lid 804 further includes a suction cup 830 that may be similar to the other suction cups described herein, except that the suction cup 830 does not have a cavity in its base and does not necessarily have the same base structure as the other suction cups due to differences in size. For example, the suction cup 830 has a base 832 that is flat and planar in some embodiments with a cavity 834 in the suction cup 830 instead of in the base 832 to improve the adhesion properties of the suction cup 830 relative to a support surface. In some embodiments, the first receptacle 802 and the first lid 804 have a size and shape to be interchangeably coupled to the cups, bowls, and lids described herein. In one or more embodiments, the first receptacle 802 and first lid 804 are not interchangeably coupleable with the other structures described herein because of their increased size. However, the first receptacle and first lid 804 are interchangeably coupleable in a stacked arrangement with other similarly sized receptacles and lids.

Figure 40:
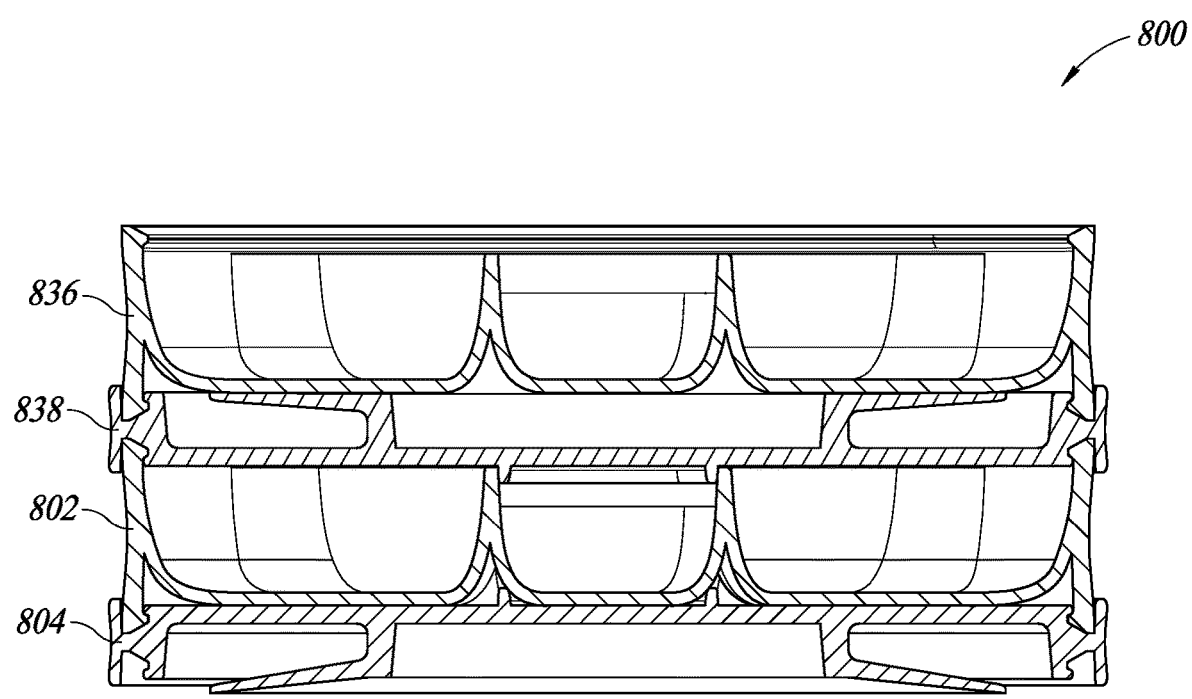
FIG. 40 is a diametric cross-sectional view of the modular storage system of FIG. 36 coupled to a second receptacle and a second lid in a stacked arrangement.

For example, FIG. 40 is a diametric cross-sectional view of the system 800 with the first receptacle 802 and the first lid 804 coupled to a second receptacle 836 and a second lid 838 in a stacked arrangement. The second receptacle 836 and the second lid 838 may be similar to the first receptacle 802 and the first lid 804, respectively, such that the second lid 838 is adapted to receive the first and second receptacles 802, 836 in the space saving stacked arrangement shown in FIG. 40 in a similar manner to other systems described herein.

As such, the systems, devices, and methods described herein provide a modular storage system with bowls, cups, plates, and lids that have a space saving, stackable design. Moreover, the component parts can be configured in a number of different use configurations to prevent spilling of the materials stored in the system. The dual functionality of certain component parts, such as the lids described herein, improves the functionality and efficiency of the design over known storage systems.

In the above description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with snack systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" or other like phrases, such as "in one or more embodiments" or "in some embodiments" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

Relative terms such as "approximately," "substantially," and other like terms, when used to describe a value, amount, quantity, or dimension, generally refer to a value, amount, quantity, or dimension that is within plus or minus 5% of the stated value, amount, quantity, or dimension, unless the context clearly dictates otherwise. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

U.S. Provisional Patent Application No. 63/039,353, filed Jun. 15, 2020, is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a first receptacle including:
      a body having a first end and a second end opposite the first end;
      a first cavity in the first end of the body; and
      a second cavity in the second end of the body; and
   a first lid interchangeably coupleable to the first end and the second end of the body of the first receptacle, the first lid including a suction cup having a concavity facing away from the body when the first lid is coupled to the second end of the body, the first lid structured to contact the second end of the body in the second cavity when the first lid is coupled to the second end of the body and the concavity of the suction cup is urged toward a support surface away from the body.

2. The system of claim 1 wherein the body further includes a first lip at the first end and a second lip at the second end, the first lip extending into the first cavity and the second lip extending into the second cavity.

3. The system of claim 2 wherein the first lid further includes a first channel structured to receive the first lip and the second lip of the body of the first receptacle to facilitate the interchangeable coupling of the first lid to the body of the first receptacle at the first end and the second end.

4. The system of claim 3 wherein the first lid includes a second channel, the system further comprising:
a second receptacle having a lip, wherein the second channel of the lid is structured to receive the lip of the second receptacle while the first receptacle and the second receptacle are in a stacked arrangement.

5. The system of claim 1 further comprising:
a second lid interchangeably coupleable to the first end and the second end of the body of the first receptacle, the second lid including a flexible portion having a plurality of slits structured to selectively provide access to the first cavity in the body through the plurality of slits.

6. The system of claim 1 further comprising:
a second lid removably coupleable to the first end of the body of the first receptacle, the second lid having a lip and a protrusion with an axial bore through the protrusion, the first lid interchangeably coupleable to the lip of the second lid and the second end of the body of the first receptacle; and
a straw structured to be received through the axial bore of the protrusion of the second lid, the straw including at least one protrusion structured to prevent the straw from sliding entirely through the axial bore of the protrusion.

7. The system of claim 1 wherein the first lid has a first height and the suction cup of the first lid has a peripheral edge and a second height from the base of the suction cup to the peripheral edge of the suction cup that is greater than the first height.

8. A device, comprising:
a first receptacle having a first surface and a second surface opposite the first surface;
an opening in the first surface of the first receptacle;
a first lid having a first surface and a second surface opposite the first surface, the first lid including a suction cup extending from the first surface of the first lid, the suction cup having a concavity, the first lid being manipulatable between a first position in which the first lid is coupled to the first surface of the first receptacle to restrict access to the opening and a second position in which the second surface of the first lid is coupled to the second surface of the first receptacle to provide access to the opening and in which the concavity of the suction cup faces away from the second surface of the first receptacle with the suction cup securable to a surface external to the first receptacle.

9. The device of claim 8 further comprising:
a second lid removably coupleable to the first receptacle and configured to cover the first opening, the second lid including at least one slit therethrough to provide access into the first receptacle through the at least one slit and the first opening, the first lid interchangeably coupleable with the second lid and the first receptacle.

10. The device of claim 9 further comprising:
a second receptacle configured to be coupleable to the first lid and the second lid in a stacked arrangement; and
a third lid configured to be coupleable to the first receptacle, the second receptacle, the first lid, and the second lid in the stacked arrangement.

11. The device of claim 9 wherein the first lid includes a center and each of the at least one slits includes a first portion extending from the center of the first lid and a second portion transverse to the first portion.

12. The device of claim 8 wherein the first receptacle includes:
a first flange extending from the first surface of the first receptacle;
a ridge extending from the second surface of the first receptacle; and
a second flange extending from the ridge.

13. The device of claim 12 wherein the first lid includes a first channel and a third flange extending around at least a portion of the first channel, the third flange configured to frictionally engage the first flange or the second flange of the first receptacle.

14. The device of claim 8 further comprising:
a second lid removably coupleable to the first surface of the first receptacle, the second lid having a lip and a protrusion with an axial bore through the protrusion, the first lid interchangeably coupleable to the lip of the second lid and the second surface of the first receptacle; and
a straw structured to be received through the axial bore of the protrusion of the second lid, the straw including a sidewall and a stopper extending from the sidewall of the straw.

15. A device, comprising:
a base having a top portion and a bottom portion;
a cavity in the top portion of the base; and
a first lid having a first surface and a second surface opposite to the first surface, the first lid further including a suction cup extending from the first surface with the suction cup having a concavity,
wherein the first lid is manipulatable from a first position in which the first lid is coupled to the top portion of the base and a second position in which the first lid is coupled to the second bottom portion of the base,
wherein in the second position with the first lid coupled to the bottom portion of the base, the suction cup is securable to an external surface with the concavity of the suction cup facing away from the base.

16. A device, comprising:
a base having a first portion and a second portion;
a cavity in the first portion of the base;
a first lid having a suction cup, wherein the first lid is manipulatable from a first position in which the first lid is coupled to the first portion of the base and a second position in which the first lid is coupled to the second portion of the base and the suction cup is securable to an external surface; and
a second lid interchangeably coupleable to the base and to the first lid, the second lid including a flexible portion and at least one slit in the flexible portion configured to provide access to the cavity through the at least one slit.

17. The device of claim 15 further comprising:
a second lid coupleable to the base and having an opening; and a straw structured to be received through the opening, the first lid interchangeably coupleable with the second lid and the second portion of the body.

18. The device of claim 15 wherein the first lid has a first height and the suction cup has a base and a peripheral edge, a second height from the base to the peripheral edge of the suction cup being greater than the first height.

19. The device of claim 15 wherein the base is a cup, plate, or bowl.

20. The device of claim 16 wherein the first lid has a first surface and a second surface opposite the first surface, the first lid including:
- a first channel in the first surface of the first lid and extending around the suction cup;
- a second channel in the first surface of the first lid and extending around the first channel; and
- a third channel in the second surface of the first lid and aligned with the second channel, the third channel structured to be coupled to the first portion of the base with the first lid in the first position or the second portion of the base with the first lid in the second position.

\* \* \* \* \*